United States Patent [19]
Demers et al.

[11] Patent Number: 6,033,544
[45] Date of Patent: Mar. 7, 2000

[54] LIQUID DISTRIBUTION SYSTEM

[75] Inventors: Robert Demers, Cranbury; Sterling Eduard McBride, Lawrenceville, both of N.J.; Christina Marie Knoedler, Newtown, Pa.; Robert Amantea, Manalapan, N.J.; Richard Moroney, Plainsboro, N.J.; Satyam Choudary Cherukuri, Cranbury, N.J.; Pamela Kay York, Yardley, Pa.; Paul L. Brown, Highland Park, N.J.

[73] Assignee: Sarnoff Corporation, Princeton, N.J.

[21] Appl. No.: 08/744,386

[22] Filed: Nov. 7, 1996

Related U.S. Application Data

[63] Continuation-in-part of application No. 08/730,636, Oct. 11, 1996, abandoned.

[51] Int. Cl.[7] .................................................. G01N 27/26
[52] U.S. Cl. .......................... 204/450; 204/451; 204/454; 422/50; 422/99
[58] Field of Search .................................. 204/450, 601; 7/451, 454, 600, 99, 131, 134; 422/50, 188; 436/809

[56] References Cited

U.S. PATENT DOCUMENTS

| | | | |
|---|---|---|---|
| 3,957,583 | 5/1976 | Gibson et al. | 195/103.5 R |
| 4,038,151 | 7/1977 | Fadler et al. | 195/127 |
| 4,271,119 | 6/1981 | Columbus | 422/50 |
| 4,283,262 | 8/1981 | Cormier et al. | 204/195 M |
| 4,310,399 | 1/1982 | Columbus | 204/195 R |
| 4,316,233 | 2/1982 | Chato et al. | 361/233 |
| 4,426,451 | 1/1984 | Columbus | 436/518 |
| 4,517,338 | 5/1985 | Urdea et al. | 525/54.11 |
| 4,601,881 | 7/1986 | Webster | 422/67 |
| 4,634,057 | 1/1987 | Coffee et al. | 239/690 |
| 4,676,274 | 6/1987 | Brown | 137/806 |
| 4,704,256 | 11/1987 | Hood et al. | 422/68 |
| 4,908,112 | 3/1990 | Pace | 204/299 R |
| 4,911,782 | 3/1990 | Brown | 156/633 |
| 5,089,233 | 2/1992 | De Vaney, Jr. et al. | 422/99 |
| 5,144,139 | 9/1992 | Hillman et al. | 250/341 |
| 5,176,881 | 1/1993 | Sepaniak et al. | |
| 5,180,480 | 1/1993 | Manz | 204/299 R |

(List continued on next page.)

FOREIGN PATENT DOCUMENTS

| | | |
|---|---|---|
| 0 377 202 A2 | 7/1990 | European Pat. Off. . |
| 0 501 796 A2 | 9/1992 | European Pat. Off. . |
| 0 595 290 A2 | 5/1994 | European Pat. Off. . |
| 0 672 835 A1 | 9/1995 | European Pat. Off. . |
| WO 92/21883 | 12/1992 | WIPO . |

OTHER PUBLICATIONS

International Search Report, PCT/US97/18266, Our Ref. SAR 12385PCT.

Richter et al. ("A micromachined electrohydrodynamic (EHD) pump", Sensors and Actuators A, 29 (1991), pp. 159–168).

Primary Examiner—Robert Warden
Assistant Examiner—Alex Naguerola
Attorney, Agent, or Firm—William J. Burke

[57] ABSTRACT

The present invention provides a liquid distribution system, which is useful in a number of contexts, including in accomplishing various synthetic, diagnostic and drug screening reactions. The distribution system can comprise an alpha reservoir and a beta reservoir, a first set of parallel and adjacent first and second feeder channels and a second set of parallel and adjacent third and fourth feeder channels which are offset from the first and second feeder channelswherein (a) the first and third feeder channels are connected to the alpha reservoir via a first connector channel that is situated above or below the second and fourth feeder channels and are independent of the beta reservoir and (b) the second and fourth feeder channels are connected to the beta reservoir via a second connector channel that is situated above or below the first and third feeder channels and are independent of the alpha reservoir. The distribution system is preferably a microscale distribution system. Various particular mechanisms for controlling flow into a liquid distribution system are described.

24 Claims, 14 Drawing Sheets

U.S. PATENT DOCUMENTS

| | | | |
|---|---|---|---|
| 5,197,517 | 3/1993 | Perera | 137/813 |
| 5,240,578 | 8/1993 | Tatsumi . | |
| 5,250,263 | 10/1993 | Manz | 422/81 |
| 5,252,296 | 10/1993 | Zuckermann et al. | 422/116 |
| 5,279,791 | 1/1994 | Aldrich et al. | 422/58 |
| 5,288,468 | 2/1994 | Church et al. | 422/116 |
| 5,296,375 | 3/1994 | Kricka et al. | 435/291 |
| 5,310,463 | 5/1994 | Dadoo et al. | 204/180.1 |
| 5,378,334 | 1/1995 | Dadoo et al. . | |
| 5,427,946 | 6/1995 | Kricka et al. | 435/291 |
| 5,443,673 | 8/1995 | Fisher et al. . | |
| 5,480,614 | 1/1996 | Kamahori | 422/70 |
| 5,503,805 | 4/1996 | Sugarman et al. | 422/131 |
| 5,603,351 | 2/1997 | Cherukuri et al. . | |
| 5,646,039 | 7/1997 | Northrup et al. . | |
| 5,731,212 | 3/1998 | Gavin et al. | 436/526 |

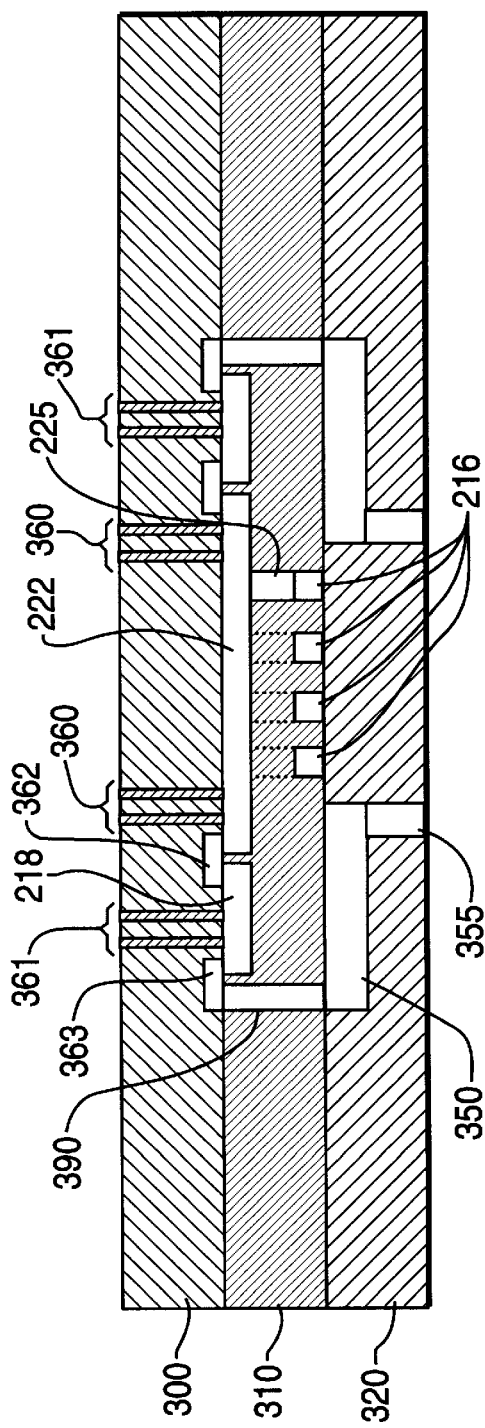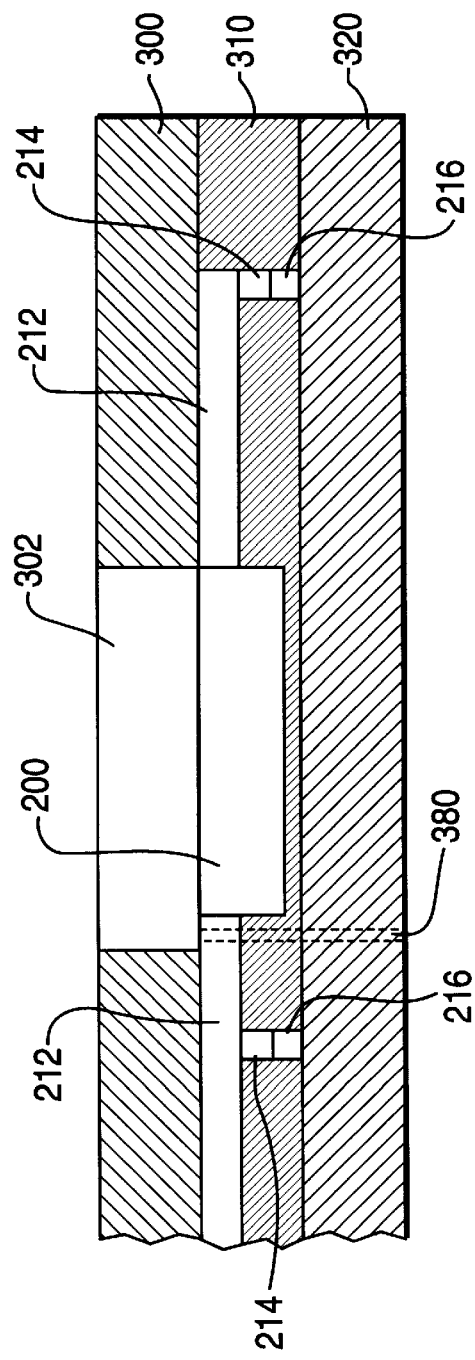

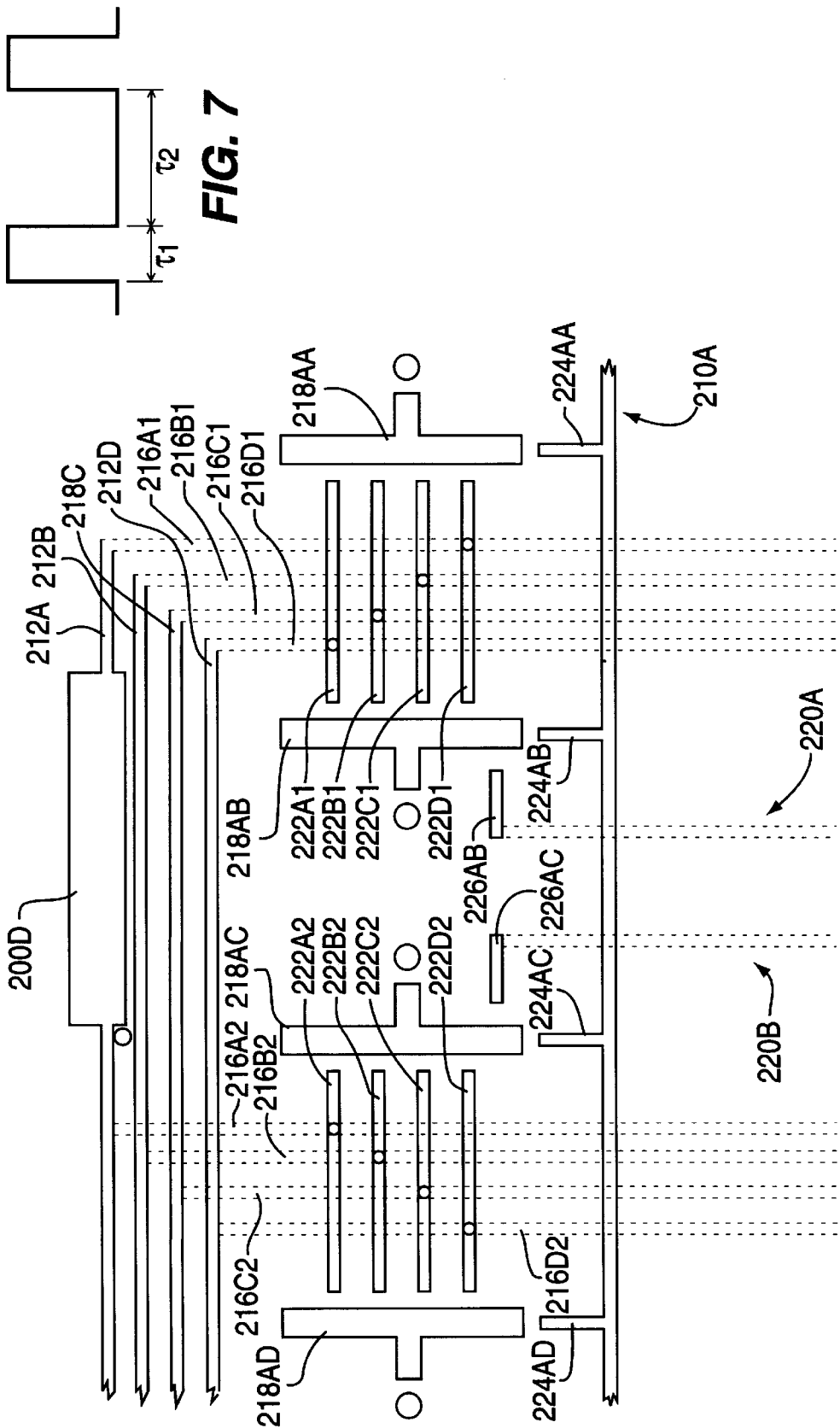

DROP FEED APPROACH

BOTTOM FEED APPROACH

LIQUID DISTRIBUTION SYSTEM

The present application is a continuation-in-part of U.S. application Ser. No. 08\730,636, titled "Liquid Distribution System", filed Oct. 11, 1996, now abandoned. This application is related to the following copending applications: U.S. application Ser. No. 08/556,036, titled "Liquid Distribution System", filed Nov. 9, 1995; U.S. application Ser. No. 08/338,703, titled "A Partitioned Microelectronic and Fluidic Device Array for Clinical Diagnostics and Chemical Synthesis", filed Nov. 10, 1994, now U.S Pat. No. 5,585,069; U.S. application Ser. No. 08/469,238, titled "Apparatus and Methods for Controlling Fluid Flow in Microchannels", filed Jun. 6, 1995, now U.S. Pat. No. 5,632,876; and U.S. application Ser. No. 08/483,331, titled "Method and System for Inhibiting Cross-Contamination in Fluids of Combinatorial Chemistry Device", filed Jun. 7, 1995, now U.S. Pat. No. 5,603,351; U.S. application Ser. No. 08/556,423, titled "Electrokinetic Pumping", filed Nov. 9, 1995; U.S. application Ser. No. 08/554,887, titled "Method Of Producing Micro-Electrical Conduits", filed Nov. 9, 1995, now U.S. Pat. No. 5,842,106; and U.S. application Ser. No. 08/630,018, titled Plate For Reaction System, filed Apr. 9, 1996, now U.S. Pat. No. 5,840,256.

This application relates to a method and system for manipulating fluids, which is useful in a number of contexts, including in accomplishing various synthetic, diagnostic and drug screening reactions. More particularly, this invention relates to a system and method, which incorporates a layered array, for distributing reagent liquids while inhibiting the contamination or cross-contamination of these liquids.

Recently, a number of academic articles have focused on the problems associated with conducting chemical reactions on a micro-scale. This literature has discussed the possibility of managing such reactions on wafer-sized solid supports that have been etched to create microchannels. Reactor systems of this scale could allow multiple diagnostic or drug screening assays to be conducted in a transportable device that uses small amounts of reagents, thus reducing supply and disposal costs.

One mechanism for developing new drugs not provided for by nature has been dubbed "rational" drug design. This process looks at the structures of biological macromolecules as determined by crystallography and at the structures of pharmacological agents known to interact with these macromolecules. With the use of computer workstations, it was hoped that new pharmacological agents could be designed that had appropriately positioned functionalities for strongly interacting with the macromolecule. One difficulty with this approach is that growing crystals appropriate for crystallographic structural determinations is a tedious, empirical science. In many cases, it is unclear if appropriate crystals can be grown (for instance, for the glycoprotein hormones such a chorionic gonadotropin or other glycoproteins). Another difficulty is that chemistry does not provide the malleable construction tools evoked by the phrase "design"; instead, chemical building blocks provide only a limited number of bond angles and lengths. For example, the structural routes by which a chlorine group might be positioned in a particular part of a drug-binding pocket in the macromolecule may be many, while the advantages or disadvantages of the ancillary structures needed to position this group are hard to "rationally" evaluate.

Combinatorial chemistry seeks to create its own "evolutionary" process that selects for compounds with the desired pharmacological activity. The key to making the process evolutionary is to generate large families of "mutants", in this case families of compounds with some chemical relatedness but with clear differences. The concepts of rational design may be taken advantage of in selecting the families of compounds to be explored by the combinatorial method.

Combinatorial chemistry seeks to generate new leads to classes of compounds that have potential pharmacological activity. Traditionally, such leads have been found by screening various plant or animal extracts for pharmacological activity. Such extracts are tedious to obtain, may have very small concentrations of potentially useful compounds, and at best only contain compounds selected by evolutionary pressures that may have nothing to do with the disease that is sought to be treated. After an extract has been identified, the process provides little information as to the identity of the active ingredient.

Combinatorial chemistry seeks to create the large, diverse family of compounds by permutation of a relatively limited set of building block chemicals. Preferably, the combinatorial method will create identifiable pools containing one or more synthetic compounds. These pools need not be identifiable by the chemical structure of the component compounds, but should be identifiable by the chemical protocol that created the compounds.

These pools are then screened in an assay that is believed to correlate with a pharmacological activity. Those pools that produce promising results are examined further to identify the component compounds and to identify which of the component compounds are responsible for the results.

The follow-up protocol used to identify the active compounds in a combinatorial pool can also involve a combinatorial method. For instance, the promising pool could result from the reaction, first, of a mixture of compounds A, B and C, which compounds do not react with one another, with compounds D, E and F, which compounds do not react with one another but do react with compounds A, B or C. Second, the resulting compounds are reacted with compounds G, H and I. To narrow the possible identity of the active compounds in the pool, the A-D, A-E, A-F, B-D, B-E, B-F, C-D, C-E and C-F products can be separately created by combinatorial chemistry and separately reacted with a the mixture of G, H and I. After this step, the sub-pool that is active in the screening assay generally will contain a more limited family of compounds.

Once promising molecules are identified by combinatorial chemistry, the identified molecules provide information that aides in the design of further combinatorial experiments. The full array of promising compounds identified by combinatorial chemistry can provide valuable information to guide traditional pharmaceutical chemistry efforts.

A popular tool in the emerging field of combinatorial chemistry is to attach the first chemical building blocks to solid support, typically a glass or polymeric support, such as the supports used in the well known Merrifield method for synthesizing polypeptides. This attachment provides a mechanism for quickly isolating product by simply washing away reactants and related impurities and decoupling the product from the support. In some cases, the support-coupled product can be assayed for pharmacological activity.

Miniaturization is usefully employed in combinatorial chemistry since: (i) workers generally seek compounds that are pharmacologically active in small concentrations; (ii) in creating a vast "evolutionary" assortment of candidate molecules it is preferable to have the numerous reactions well documented and preferably under the direction of a limited number of workers to establish reproducibility of technique;

(iii) it is expensive to create a vast, traditionally-scaled synthetic chemistry complex for creating a sufficiently diverse family of candidate compounds; and (iv) substantial concerns are raised by the prospect of conducting assays of the products of combinatorial chemistry at more standard reaction scales. Miniaturization allows for the economic use of robotic control, thereby furthering reproducibility.

The wafer-sized devices described above can be ideal for combinatorial chemistry, allowing for numerous synthetic chemistry reactions to be conducted substantially under computer control using only small quantities of reagents. However, the academic literature advocating such microscale devices has not adequately addressed fundamental issues in conducting combinatorial chemistry at this scale: for instance, how does one manage to shuttle reagents through a complex microscale device and accomplish this without significant cross-contamination while allowing a complex assortment of different syntheses to occur in a large number of microscale reaction vessels (e.g., 100 to 10,000) in the device? Co-pending U.S. application Ser. No. 08/556, 036, entitled "Liquid Distribution System," describes a device that makes a reality of the dream of miniaturization. The system described therein, however, can be improved upon. Described herein below are the basic attributes of such a liquid distribution system and additional features. The additional features improve the reproducibility of fluid pumping using electrode-based pumps having no moving parts, provide means for recharging a fluid-delivery pathway from a reservoir to a set of reaction cells with a new reagent while minimizing the contamination of the new reagent with the prior reagent, provide means to clear the reaction cells of fluid, and provide means for non-selectively delivering a liquid such as a wash reagent or an acid or base solution used in deprotection chemistry to all of the cells of the system, or a significant subpart of the system. Further, the system described herein has gasket seals produced by an improved method of forming the seals and assuring a liquid or gastight seal between regions of a surface that is sealed to another surface via the gasket seal.

SUMMARY OF THE INVENTION

The invention relates to a number of systems that can be applied to selective liquid distribution systems. In a first embodiment, the liquid distribution system comprises: (a) a liquid source; and (b) a channel addressable by the liquid source and having a capillary barrier, wherein the liquid distribution system comprises two or more joined plates comprising a channel plate and a barrier plate wherein the channel is formed in a channel surface of the channel plate, wherein the channel surface is joined to a surface of the barrier plate, and wherein the capillary barrier is formed by a barrier opening that is formed through the barrier plate, which opening intersects the channel. Preferably, in fluid connection with the barrier opening there is a vertical feeder channel that connects to a reaction cell.

In a second embodiment, liquid distribution system comprises: (a) a liquid source; (b) a channel addressable by the liquid source and having a capillary barrier; (c) a pressure regulator for regulating the hydrostatic pressure of the liquid source such that the hydrostatic pressure can be changed from less than that required to breach the capillary barrier to at least that required to breach the capillary barrier and initiate liquid flow past the capillary barrier.

In a third embodiment, the liquid distribution system comprises: (a) a liquid source; and (b) a channel addressable by the liquid source and having a capillary barrier, wherein the capillary barrier opens into a chamber that is drained by a vertical feeder channel that connects to a reaction cell. Preferably, the liquid distribution system further comprises a gas pressure distribution system having an outlet into the chamber. Preferably, the liquid in the liquid source is operated with a hydrostatic pressure from about 0 dynes per $cm^2$ to about $5\times10^3$ dynes per $cm^2$.

In a fourth embodiment, the liquid distribution system comprises: (a) a liquid source; and (b) a channel addressable by the liquid source and having a capillary barrier, wherein the liquid distribution system comprises a source of negative pressure that can attached either to the liquid source or the channel to aspirate the liquid out of the channel.

In a fifth embodiment, the liquid distribution system comprises (a) liquid source operable to maintain a hydrostatic pressure, (b) a reaction cell, (c) a channel addressable by the liquid source and connected to the reaction cell, and (d) an electrokinetic pump that controls the flow of liquid in the channel. Preferably, the hydrostatic pressure is maintained by applying gas pressure to the liquid source.

In a sixth embodiment, the invention provides a method of forming a gasket comprising: (a) screen printing a curable polymeric material onto a surface of a substrate so as to form a gasket pattern that can be used to prevent fluid inflow and outflow from an area of the surface; (b) applying a platen to the top surface of the printed gasket pattern; and (c) curing the printed polymeric material to obtain the gasket. Preferably, in certain embodiments, the platen is impressed upon the printed gasket pattern until it encounters mechanical stops. Preferably, the method further comprises, after step (a) but before step (b): (d) first, curing the polymeric material of the printed gasket pattern; and (e) second, adding to the printed gasket pattern by overlaying a second screen print of curable polymeric material onto the printed gasket pattern to increase the amount of polymeric material in the printed gasket pattern. Preferably, in applying the platen after step (e), the platen is applied so as to apply a uniform weight to the twice-printed gasket pattern, where the uniformly applied weight is between about 0.5 lbs. per $in^2$ and about 6 lbs. per $in^2$.

In an seventh embodiment, the invention provides a liquid distribution system comprising: (a) two or more a liquid sources; (b) for each said liquid source, a channel addressable by the liquid source and having a capillary barrier; (c) a manifold connected to the outlets of said channels; and (d) a reaction cell into which liquid from the manifold drains.

BRIEF DESCRIPTION OF THE DRAWINGS

FIG. 5A shows a cross-section along an EW axis through a distribution channel.

FIG. 5B shows a cross-section along an EW axis through a first reservoir.

FIG. 6 is a top view of a part of a distribution plate.

FIG. 7 shows a voltage pulse pattern used to power an electrode-based pump useful in the liquid distribution system of the invention.

DEFINITIONS

Figure 1:
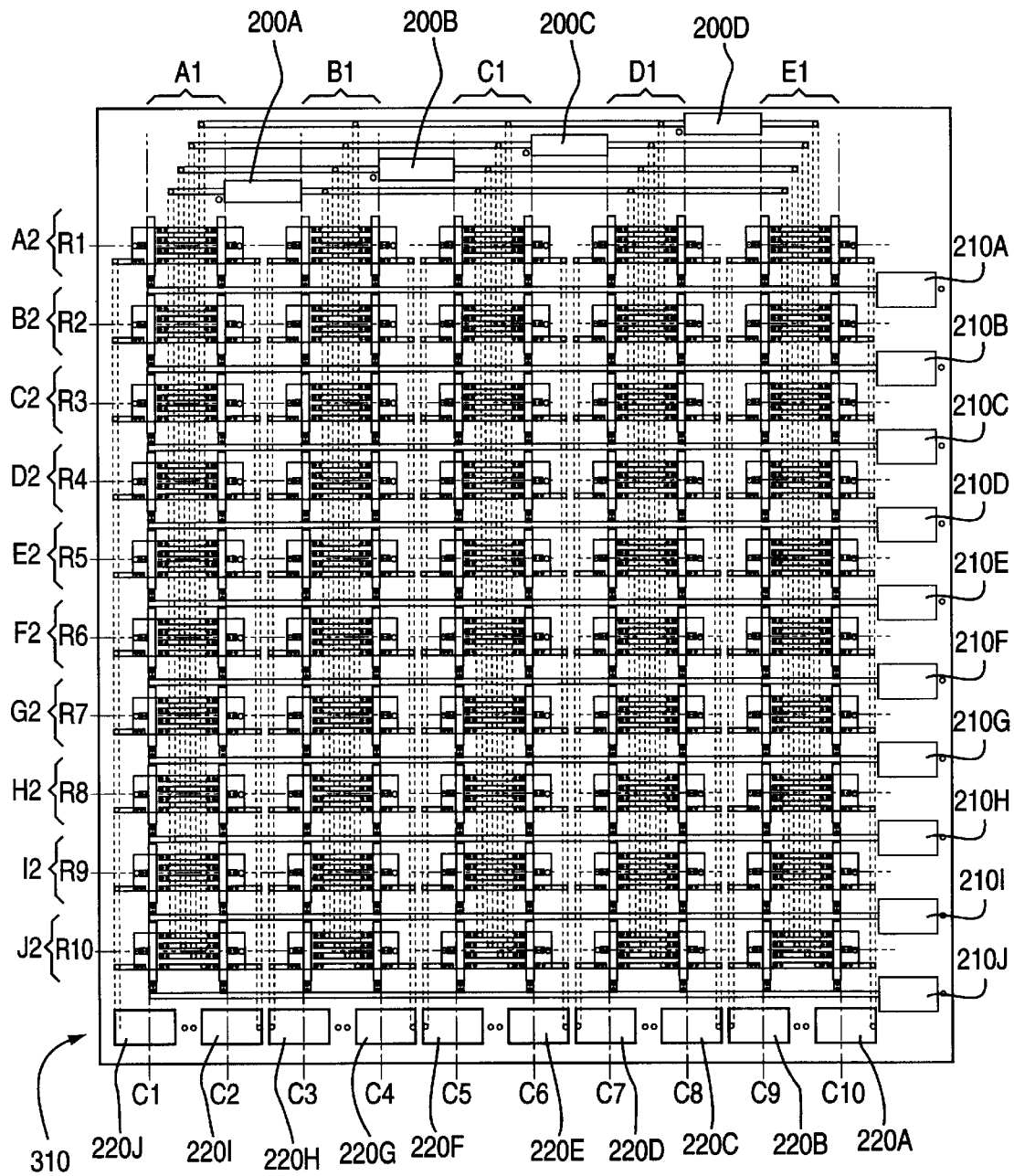
FIG. 1 displays a distribution plate according to the invention.

The following terms shall have the meaning set forth below:

Addressable

A reaction cell or channel is "addressable" by a reservoir or another channel if liquid from the reservoir or other channel can be directed to the reaction cell or channel.

Adjacent

"Adjacent" as used in these situations: (i) a first structure in one of the plates is adjacent to a second structure in the same or another plate if the vertical projection of the first structure onto the plate of the second structure superimposes the first structure on the second or places it within about 250 μm of the second; and (ii) groupings of two or more channels are adjacent to one another if each channel is in substantially the same horizontal plane, and all but the outside two channels in the grouping are adjacent (in the sense defined in (i) above) to two neighbor channels in the grouping. Preferably, under item (i), a first structure is adjacent to a second structure if the vertical projection of the first structure onto the plate of the second structure superimposes the first structure on the second or places it within about 150 μm of the second.

Capillary Dimensions

"Capillary dimensions" are dimensions that favor capillary flow of a liquid.

Typically, channels of capillary dimensions are no wider than about 1.5 mm. Preferably channels are no wider than about 500 μm, yet more preferably no wider than about 250 μm, still more preferably no wider than about 150 μm.

Capillary Barrier

A "capillary barrier" is a barrier to fluid flow in a channel comprising an opening of the channel into a larger space designed to favor the formation, by liquid in the channel, of an energy minimizing liquid surface such as a meniscus at the opening.

Connected

The channels, reservoirs and reaction cells of the invention are "connected" if there is a route allowing fluid between them, which route does not involve using a reaction cell as part of the link.

Directly Connected

Reservoirs and horizontal channels are "directly connected" if they are connected and either (1) no other channel is interposed between them or (2) only a single vertical channel is interposed between them.

Hole Diameter

Because techniques for fabricating small holes often create holes that are wider at one end than the other (for instance, about 50 microns wider), the hole diameter values recited to herein refer to the narrowest diameter.

Horizontal, Vertical, EW, NS

Indications of the orientation of a part of the distribution system refer to the orientation when the device is in use. The notations "EW axis" and "NS axis" are in reference to FIGS. 1, 2 and 6, where an EW axis goes from right to left and is perpendicular to the long axis of the page and a NS axis is from top to bottom parallel to the long axis of the page.

Independent

Channels, reservoirs or reaction cells that are not connected are "independent."

Offset

Two sets of channels are "offset" when none of the channels in the first such set is adjacent to any of the channels in the second set.

Perpendicular

Channels in the distribution plate are "perpendicular" even if primarily located on separate horizontal planes if their vertical projections onto the same horizontal plane are perpendicular.

Reservoir

Unless a different meaning is apparent from the context, the terms "reservoir" and "fluid reservoir" include the horizontal extension channels (sometimes simply termed "extensions") directly connected to the reservoir or fluid reservoir.

Second Reservoir Extension Channels

These "extension channels" include the distribution channels that may branch off of these extension channels.

Substantially the Length of one of the Horizontal Dimensions

"Substantially the length of one of the horizontal dimensions" means at least about 70% of on of the major horizontal dimensions (e.g. the EW or NS dimensions illustrated in the Figures) of the distribution plate.

U-Plumbing Channel

A channel designed to connect at least two channels or reservoirs such that the liquid level in one of the connected channels or reservoirs will equalize with the liquid level in the other connected channel or reservoirs due to hydrological forces. U-plumbing channels typically have vertical channels that connect channels or reservoirs located in a higher vertical plane with a substantially horizontal channel segment of the U-plumbing channel located in a lower plane—these vertical and horizontal segments together comprise the U-plumbing channel. The feeder channels of the invention are typically U-plumbing channels.

DETAILED DESCRIPTION

The invention also relates to a number of other embodiments. The invention provides, in an eighth embodiment, a distribution system comprising an alpha reservoir and a beta reservoir, a first set of parallel and adjacent first and second feeder channels and a second set of parallel and adjacent third and fourth feeder channels which are offset from the first and second feeder channels, wherein (a) the first and third feeder channels are connected to the alpha reservoir by a first connector channel that is situated above or below the second and fourth feeder channels and are independent of the beta reservoir and (b) the second and fourth feeder channels are connected to the beta reservoir by a second connector channel that is situated above or below the first and third feeder channels and are independent of the alpha reservoir. In one embodiment, the first and second feeder channels are each connected to a first set of two or more reaction cells and the third and fourth feeder channels are each connected to a second set of two or more reaction cells. Preferably, the feeder channels of the first and second feeder channel sets are parallel to each other.

The invention provides, in a ninth embodiment, a liquid distribution system comprising: (a) a distribution plate comprising: a least two first reservoirs having a common first fill level; at least one feeder channel connected to and extending from each of the first reservoirs, each feeder channel having a horizontal feeder channel segment, wherein the top of the horizontal feeder channel segment is below the first fill level; at least one distribution channel connected to each feeder channel and having a second fill level at substantially the same elevation as the first fill level; and a first liquid level maintaining means for maintaining the liquid level in each first reservoir at the first fill level, wherein filling each first reservoir to the first fill level results in the filling of the connected feeder channels and filling the connected distribution channels to the second fill level. Preferably, the distribution plate feeder channels from each of the at least two first reservoirs are parallel and adjacent to one another. In one embodiment, each of the parallel feeder channels is connected to a separate distribution channel positioned perpendicular to the horizontal feeder channel segments of the parallel feeder channels, and each of the connected distribution channels are parallel and adjacent to one another. In an embodiment the distribution system comprises, in the distribution plate, at least two first reservoirs, more preferably at least four first reservoirs, and at least two sets of parallel, adjacent feeder channels, wherein each of the feeder channels in each set is connected to a separate reservoir, and wherein each set of parallel, adjacent feeder channels is connected to at least two sets of adjacent, perpendicular distribution channels.

In one embodiment of the ninety embodiment, the distribution system further comprises: (b) a controller; and (c) a feedthrough plate attached to the top of the distribution plate comprising supply channels extending through the feedthrough plate to the first reservoirs and electrical leads extending through the feedthrough plate, wherein the distribution plate comprises pumps at each distribution channel connected to the controller by the electrical leads extending through the feedthrough plate. Preferably, the distribution system further comprises: (d) a reaction well plate having one or more reaction cells that can be positioned below the distribution plate, wherein the distribution plate comprises conduits by which liquid can be moved from the distribution channels to the reaction cells under the control of the pumps. Preferably, the pumps in the distribution plate each comprise a first electrode and a second electrode and the controller can direct a pulsed voltage to the pumps to cause pumping. In one embodiment, the controller comprises an electrical data storage device comprising a database of pumping programs for pumping one or more liquids. In one preferred embodiment, one or more of the pumps further comprise a third electrode and, for the three electrode pumps, the controller can (i) direct a pulsed voltage across the first and second electrodes or (ii) across the first and third electrodes.

One aspect of the invention is a hydrologic liquid distribution system comprising: a distribution plate comprising: a least two first reservoirs having a common first fill level; at least one feeder channel connected to and extending from each of the first reservoirs, each feeder channel having a horizontal feeder channel segment, wherein the top of the horizontal feeder channel segment is below the first fill level; at least one distribution channel connected to each feeder channel having a second fill level at substantially the same elevation as the first fill level; and a first liquid level maintaining means for maintaining the liquid level in each first reservoir at the first fill level, wherein filling each first reservoir to the first fill level results in the filling of the connected feeder channels and filling the connected distribution channels to the second fill level. The distribution channels preferably have at least one capillary barrier.

The distribution plate is preferably coupled with a feedthrough plate that fits above the distribution plate and provides channels or conduits to allow for the passage of liquids or electrical leads through to the distribution plate. A detachable reaction cell plate is preferably coupled underneath the distribution plate and contains one or more, more preferably two or more, reaction cells into which liquids from at least two reservoirs may be distributed via the distribution plate. The reaction cell plate preferably contains about 100 or more reaction cells, each addressable by at least two reservoirs. More preferably the reaction cell plate contains about 1,000 or more reaction cells, each addressable by at least two reservoirs. Yet more preferably the reaction cell plate contains about 10,000 or more reaction cells, each addressable by at least two reservoirs.

The distribution plate preferably has multiple first reservoirs. The first reservoirs can have a primary reservoir portion and one or more first reservoir extension channels, which preferably together extend along substantially the length of one of the horizontal dimensions of the distribution plate. Two or more such extended first reservoirs are preferably adjacent and parallelly arrayed along one side of the distribution plate. In some embodiments, it is desirable to relay liquid from two or more of such parallel, extended first reservoirs to each of two or more reaction cells arrayed along a substantially straight line (the "linear" reaction cells). To accomplish this liquid relay, preferably a first feeder channel extends from the parallel first reservoir nearest the edge of the distribution plate and underneath the interiorly located parallel first reservoirs, while separate, feeder channels, located adjacent to and parallel to the first feeder channel, extend from the interiorly located parallel first reservoirs passing beneath other first reservoirs as needed to maintain the segregation of the liquids in the reservoirs. In this preferred embodiment, arrayed adjacent to the location of each of the linear reaction cells are one distribution channel for each such first reservoir, each such distribution channel connected to a separate one of the parallel feeder channels. Thus, the distribution channels located adjacent to a reaction cell form a "bundle" of distribution channels. Using pumps located in each of the bundled distribution channels and conduits from each bundled distribution channel to the adjacent reaction cell, liquid from each of the separate first reservoirs can be distributed to any of the linear reaction cells.

Each distribution channel preferably includes at least one pump, which preferably comprises two or three electrodes. To operate the pumps in an appropriate sequence, the distribution system of the invention is preferably connected to a controller that controls each of the pumps. The preferred two electrode pumps preferably are operated by applying a pulsed voltage program appropriate for moving the liquid sought to be pumped. Preferably, the controller includes a data storage device comprising a database of pumping programs designating parameters, such as the pulse length, voltage amplitude, pulse shape and voltage polarity, suitable for moving each of a plurality of liquids.

A. A Basic Liquid Distribution System

The invention relates to methods of addressing a large number of reaction cells 350 with a plurality of fluid reservoirs 200 (see FIG. 1). In FIG. 1, reservoirs 200A–200D are connected to reservoir extension channels 212A–212D (see FIG. 6). Connected to extension channels 212A–212D are first, second, third, fourth and fifth sets A1–E1 of first, second, third and fourth feeder channels 216A–216D. The ceilings of these feeder channels are located in a horizontal plane beneath the floors of the extension channels 212A–212D. Via these extension channels, fluid from each of the four first fluid reservoirs 200A–200D can be brought to a location adjacent to any of the one hundred reaction cells 350 into which the fluid can be moved under the control of pumps or valves as described hereinbelow. Note that reaction cells 350 are located in a lower horizontal plane than first, second, third and fourth feeder channels 216A–216D. Other geometries by which a large number of reaction cells can be addressed by separated fluid reservoirs are described below.

Features of other distribution systems described in this application can be applied to this embodiment, irrespective of under which subheading they are described. It will be understood by those of ordinary skill that while the embodiments of the invention are described with reference to channels that join at orthogonal angles, other angles are possible. In preferred embodiments of the invention, the operational flow rate (i.e., the flow rate when the appropriate flow-inducing mechanisms are activated) from a given reservoir (e.g. first fluid reservoir 200) to a given reaction cell 350 is from about 0.01 µl/min to about 1 µl/min, more preferably from about 0.1 µl/min to about 0.3 µl/min.

B. Hydrologic Liquid Distribution System i. The Distribution, Feedthrough and Reaction Cell Plates

Typically, the liquid distribution system of the invention will be formed of at least three plates, a feedthrough plate 300, a distribution plate 310 and a reaction cell plate 320. The feedthrough plate 300 is typically bonded to the distribution plate 310 using one of the methods described below. The reaction cell plate 320 is typically removably fitted to the underside of the distribution plate 310, or the underside of intermediate plate 330 (not illustrated) interposed between the distribution plate 310 and the reaction cell plate 320.

Figure 2:
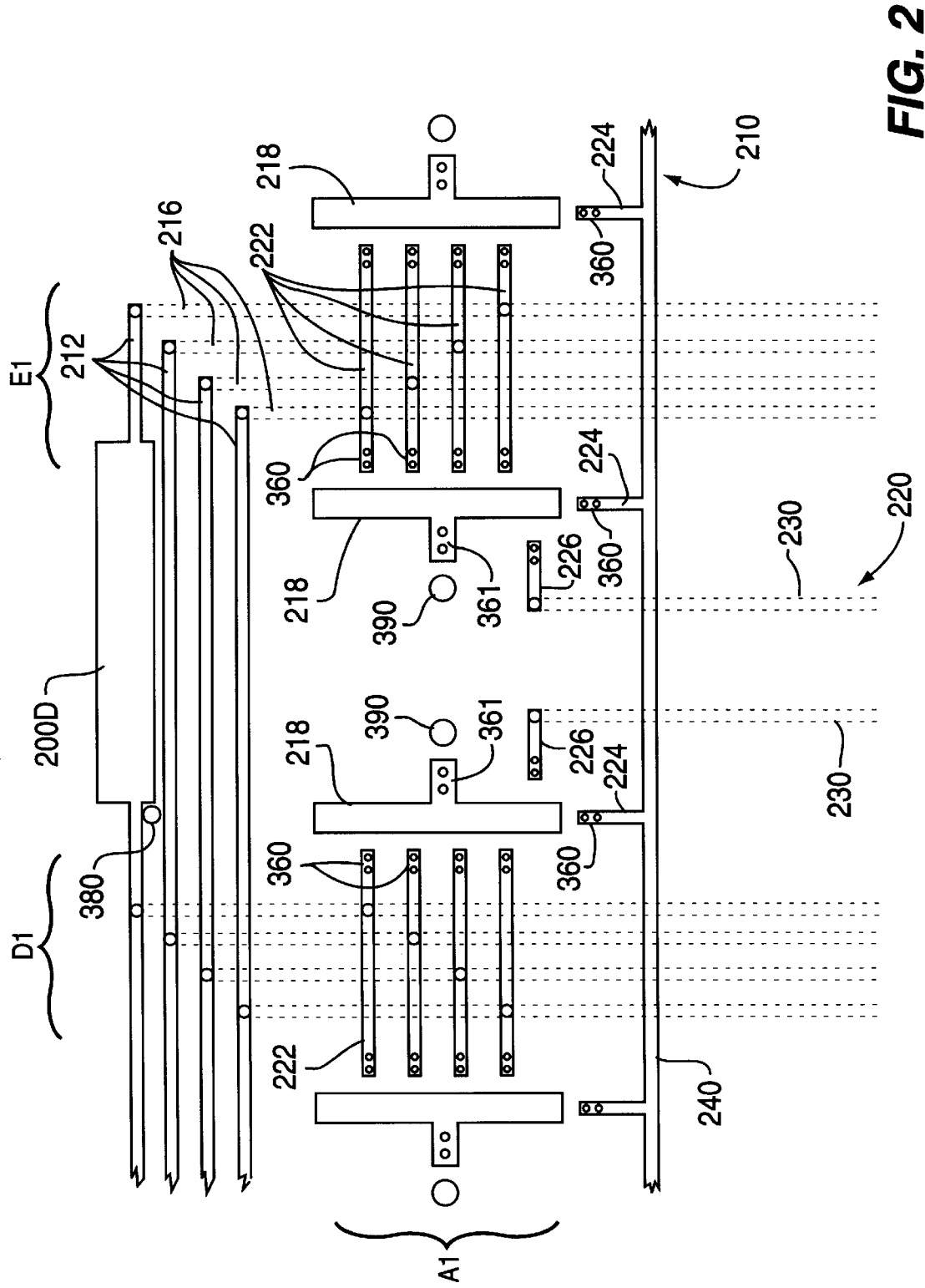
FIG. 2 displays an expanded view of a portion of the distribution plate of FIG. 1.

FIG. 1 shows the layout of a distribution plate 310 according to the invention. FIG. 2 shows an expanded view of a portion of a distribution plate 310 that better illustrates some of the features obscured by the scale of FIG. 1. Typically, the structures indicated in solid lines will be formed in the top layer of the distribution plate 310, while the structures indicated with dotted lines will be formed in the bottom layer of the distribution plate 310, except that in FIG. 1 the reaction cells 350 are indicated by boxes in solid lines even thought these structures are located in a lower plane. Where appropriate, vertical channels connect the structures in the top of the distribution plate 310 with those in the bottom. For convenience, the axis from the top of the illustration to the bottom is designated the NS axis, while the axis from right to left is the EW axis.

At the top of FIG. 1 are four first fluid reservoirs 200A, 200B, 200C and 200D, each having a defined fill level. Each of these first fluid reservoirs 200A, 200B, 200C and 200D has two first reservoir extensions 212 extending along substantially all of an EW axis of the distribution plate 310. The ceilings of the first reservoir extensions 212 preferably are at substantially the same elevation as the first fill level. At five staggered locations, A1, B1, C1, D1 and E1, along the EW axis of the first reservoir extensions 212 there are four first vertical channels 214 (see FIGS. 4 and 5B) that connect the first reservoir extensions 212 with four first horizontal feeder channel segments 216 that are formed in the bottom layer of the distribution plate 310. At each staggered location A1, B1, C1, D1 or E1, four adjacent first horizontal feeder channel segments 216, which are connected to separate first reservoir extensions 212, extend along an NS axis to ten positions, A2, B2, C2, D2, E2, F2, G2, H2, I2 and J2. At each position A2, B2, C2, D2, E2, F2, G2, I2 or J2 along the course of each such set of four adjacent first horizontal feeder channel segments 216, these first horizontal feeder channel segments 216 run between a pair of reaction cells 350 (see FIGS. 5A and 6B). At these positions A2, B2, C2, D2, E2, F2, G2, H2, I2, or J2, the four adjacent first horizontal feeder channel segments 216 are separately connected, via separate second vertical channels 225 (see FIGS. 3, 4 and 5A), to each of four perpendicular first distribution channels 222 formed in the top layer of the distribution plate 310. The ceilings of the first distribution channels 222 define a second fill level that is typically substantially the elevation of the first fill level. The fill level of a distribution channel (e.g., the second fill level) is "substantially" the fill level of the connected reservoir (e.g., the first fill level) if they are offset vertically by no more than about 10% of the depth of the channel; even if the fill levels are further offset vertically they are still substantially the same if filling the reservoir to its fill level results in filling the connected distribution channel and the retention of fluid in the connected distribution channel (for instance, retention due to the capillary barriers described further below with reference to FIG. 3). The combination of a first vertical channel 214, connected to a horizontal feeder channel segment 216, in turn connected to a second vertical channel 225 makes up a first feeder channel 217 (not identified in the Figures).

If liquids are maintained at a defined first level in a first fluid reservoir 200, then substantially the same level will be maintained in the first distribution channels 222 connected to that first fluid reservoir 200 via first feeder channels 217. This equalization occurs due to the principle that two connected bodies of liquid will tend to seek the same level and, where the size of the channels allows, due to capillary flow. Liquids are maintained at a defined level in the first fluid reservoirs. In the illustrated embodiment, liquid is fed into the fluid reservoir 200 through channels in the feedthrough plate 300 and such liquid that is not needed to fill the fluid reservoirs to the defined level is drained through drains 380. First openings 381 (not shown) are formed in the bottom layer of the feedthrough plate 300 to create a liquid connection or sluice between the first fluid reservoirs 200 and the drains 380. Liquids are maintained in the first fluid reservoirs 200 (as well as the second fluid reservoirs 210 and third fluid reservoirs 220) typically by the use of an external pump 15 (not shown), such as the model number 205U multichannel cassette pump available from Watson-Marlow, Inc. In other embodiments described below the fluid in the reservoirs is maintained with a hydrostatic pressure. Alternatively, a defined level can be maintained by monitoring the level of liquid in the first fluid reservoirs 200 (or second fluid reservoirs 210 or third fluid reservoirs 220) and only activating the pumps feeding liquid to a given fluid reservoir when needed to maintain the defined level.

Each set of four adjacent first distribution channels 222 are adjacent to two buffer channels 218, located to each side of the first distribution channels 222 along the EW axis. Liquid can be pumped from any first distribution channel 222 into the adjacent buffer channel 218 by activating the first pump 360 (indicated in FIG. 2 by two filled dots representing the electrodes of one type of pump) of the first distribution channel 222. This pumping creates additional pressure that moves the liquid over capillary barrier 370 (see FIGS. 3, and 4) separating the first distribution channel 222 and the buffer channel 218. Between each first distribution channel 222, second distribution channel 224 or third distribution channel 226 and the adjacent buffer channel 218 and between each buffer channel 218 and its adjacent third vertical channel 390 (described below) there is such a capillary barrier 370 that inhibits liquid flow when the pumps are not activated. Second openings 362 (see FIG. 3) are formed in the bottom layer of the feedthrough plate 300 to create a liquid connection or sluice between the first distribution channels 222 and the buffer channels 218. From a buffer channel 218, liquid can be pumped using a second pump 361 (indicated in FIG. 2 by two filled dots representing the electrodes of one type of pump) to a third vertical channel 390 that connects with a reaction cell in the reaction cell plate 320. Third openings 363 (not illustrated) in the bottom layer of the feedthrough plate 300 or the distribution plate 310 serve to create a liquid connection or sluice between the buffer channels 218 and third vertical channels 390.

Figure 3:
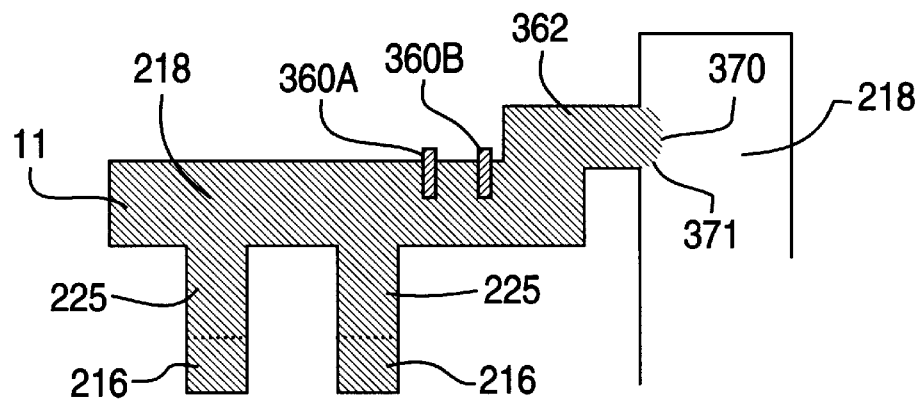
FIG. 3 shows a capillary barrier between a first distribution channel and a buffer channel.

FIG. 3 illustrates a capillary barrier 370, at which a meniscus 371 forms, at the junction between a first distribution channel 222 containing liquid 11 and either a buffer channel 218 or a third vertical channel 390. The meniscus 371 formed at the outlet of first distribution channel 222 into buffer channel 218 will tend to inhibit seepage from the first distribution channel 222, such as the seepage that can result from capillary forces. In some embodiments there are vents (not illustrated) that extend through the feedthrough plate 300 at the tops of buffer channel 218 or third vertical channel 390.

Note that only a small cut-away of NS oriented horizontal feeder channel segments 216 are shown in FIGS. 3. Typically, these channels extend inwardly and outwardly from the illustrated cut-away and connect with additional first distribution channels 222 situated to distribute liquid to other reaction cells 350.

Along the right side of the distribution plate 310 are ten second fluid reservoirs 210, each having a second reservoir extension 240 extending along an EW axis. Second distribution channels 224 form "L"-extensions off of second reservoir extensions 240 and are each positioned adjacent to a separate buffer channel 218, such that there are ten second distribution channels 224 extending off of each second reservoir extension 240. Each second distribution channel 224 has a pump 360 that can move liquid from a second distribution channel 224 to the adjacent buffer channel 218. Second openings 362 (not shown) in the bottom of feedthrough plate 300 serve to provide a sluice or route of liquid connection between the second distribution channels 224 and the buffer channels 218. Liquid moves from the buffer channels 218 to the reaction cells as described above. Located adjacent to each second reservoir 210 is a drain 380 (not shown) that operates to maintain a defined third fill level as described above.

The capillary barriers 370 and sluices created by the second openings 362 or third openings 363 (not shown) act as a combined valve and pump. The capillary barriers 370 prevent flow to the reaction cell, which flow would be favored by capillary forces, until the first pumps 360 or second pumps 361 provide the extra pressure needed to overcome the capillary barriers 370. Narrowing the sluices can increase the capillary forces favoring flow, thereby reducing the amount of added pressure needed to overcome the capillary barriers 370. The use of the capillary barriers 370 allows flow control to be governed by the first pumps 360 or second pumps 361, which are typically controlled by controller 10.

Located along the bottom edge of the distribution plate illustrated in FIG. 1 are ten third liquid fluid reservoirs 220. Horizontal feeder channel segments 230 are connected to the third fluid reservoirs 220 and to third distribution channels 226 via fourth vertical channels 227 (see FIG. 4). The third distribution channels 226 have first pumps 360 which can move liquid into adjacent buffer channels 218 via openings 362 (not shown) in the feedthrough plate 300. Located adjacent to each third fluid reservoir 220 is a drain 380 (not shown) that operates to maintain a defined fourth fill level as described above. Third fluid reservoirs 220 and connected third distribution channels 226 operate in just the same way as first fluid reservoirs 200 and first distribution channels 222. Those of ordinary skill in the art will readily envision alternative geometries wherein a number of separate third fluid reservoirs 220 can interact with a given buffer channel 218 via a number of third distribution channels 226 positioned adjacent to the buffer channel 218. Located adjacent to each third reservoir 220 is a drain 380 (not shown) that operates to maintain a defined third fill level as described above.

Figure 4:
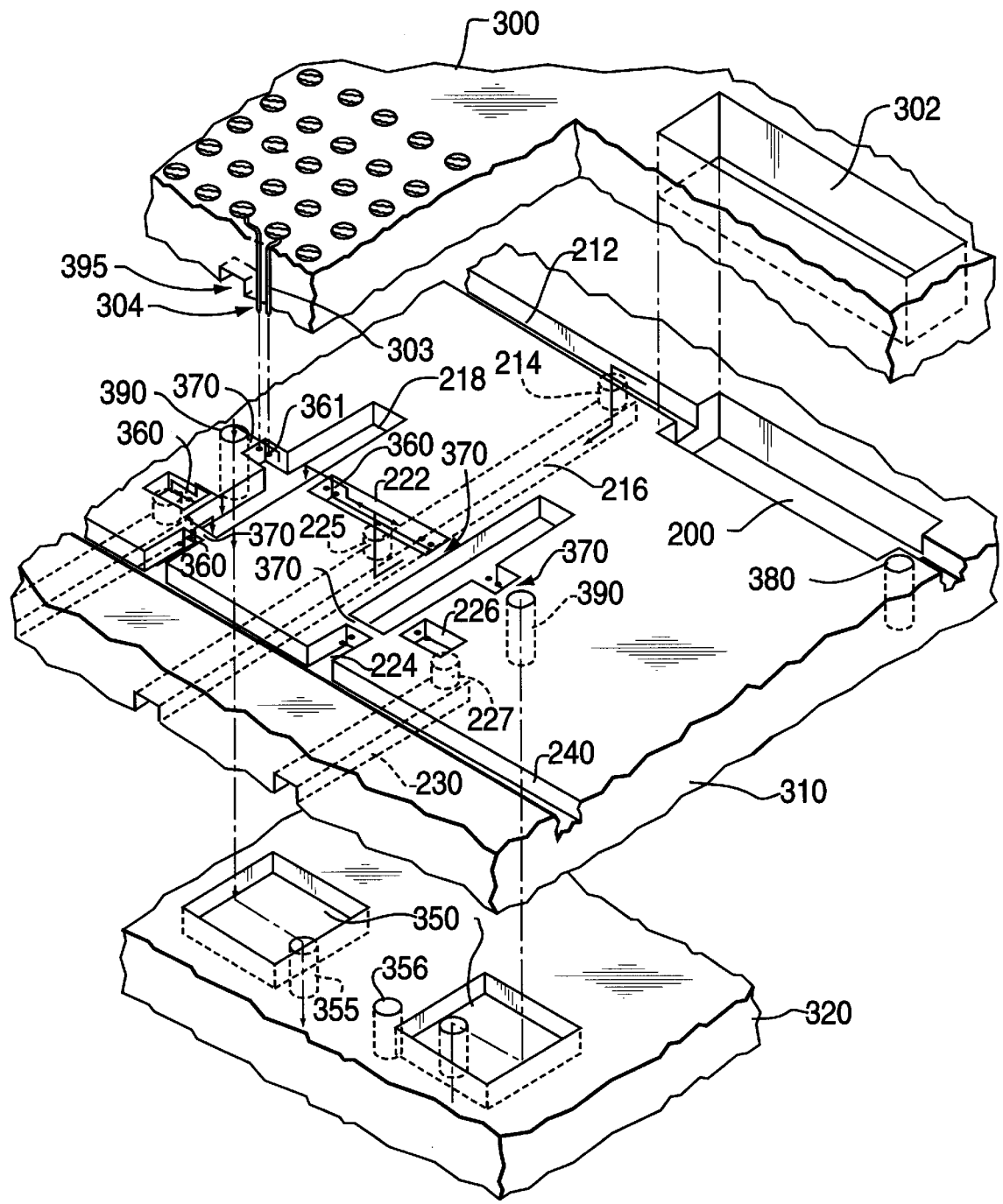
FIG. 4 shows in three dimensions various cut-away views of the feedthrough plate, distribution plate and reaction cell plate of a distribution system of the invention.

FIG. 4 shows perspective views of portions of feedthrough plate 300, distribution plate 310 and reaction cell plate 320.

FIG. 5A shows a vertical cross-section along an EW axis that slices through a first distribution channel 222. Underneath the first distribution channel 222 can be seen four horizontal feeder channel segments 216, only one of which is connected to the first distribution channel via visible second vertical channel 225. The electrodes of the first pumps 360 and second pumps 361 are illustrated. Third vertical channel 390 connects buffer channel 218 to reaction cell 350, which has a drain 355.

FIG. 5B shows a vertical cross-section along an EW axis that slices through a first fluid reservoir 200. From first fluid reservoirs extensions 212 can be seen two first vertical channels 214 that each connect to a separate horizontal feeder channel segment 216. Drain 380 for first fluid reservoir 200 is indicated by dotted lines. In the illustrated distribution system, first fluid reservoir 200 opens to the top of feedthrough plate 300 via fourth openings 302.

The operation of the liquid distribution system can be described with reference to FIG. 6. Liquid can be distributed to first reaction cell 350AA (not shown) connected to third vertical channel 390A from any of first, second or third fluid reservoirs 200A, 200B, 200C, 200D, 210A or 220A. If "liquid A" is maintained at first fluid level in fluid reservoir 200A, liquid A will flow through the connected vertical channels 214 into the connected horizontal feeder channel segments 216A, 216A2, 216A3, 216A4 and 216A5 and into the connected distribution channels 222A1, 222A2, and so on. From first distribution channel 222A1, liquid A is pumped into first buffer channel 218AA using pump 360A under the control of controller 10 (not shown). From first buffer channel 218AA, liquid A is pumped into first reaction cell 350AA via third vertical channel 390A using pump 361A under the control of controller 10.

When a distribution plate 310 according to the invention makes use of a buffer channel 218 and the buffer channel 218 lacks a vent to the outside atmosphere, the relationship between the pumping rate of a first pump 360 that pumps liquid into the buffer channel 218 and the pumping rate of a second pump 361 that pumps liquid from the buffer channel 218 to a reaction cell 350 can be manipulated to advantage. When a first pump 360 moves liquid from, for instance, distribution channel 222A1 (FIG. 6), a pressure increase is created in buffer channel 218 which inhibits flow past the capillary barriers for distribution channels 222B1, 222C1, 222D1, 224AA and 226AA. A delay in the corresponding activation of second pump 361 will result in this cross-contamination inhibiting pressure being maintained. The buffer channel 218 further serves to dilute any accidental overflows from distribution channels containing reagents not intended for the adjacent reaction cell 350. This dilution will typically reduce the concentration of reactive reagents beneath the concentration effective in the reaction process that is intended for the adjacent reaction cell 350.

Figure 16:
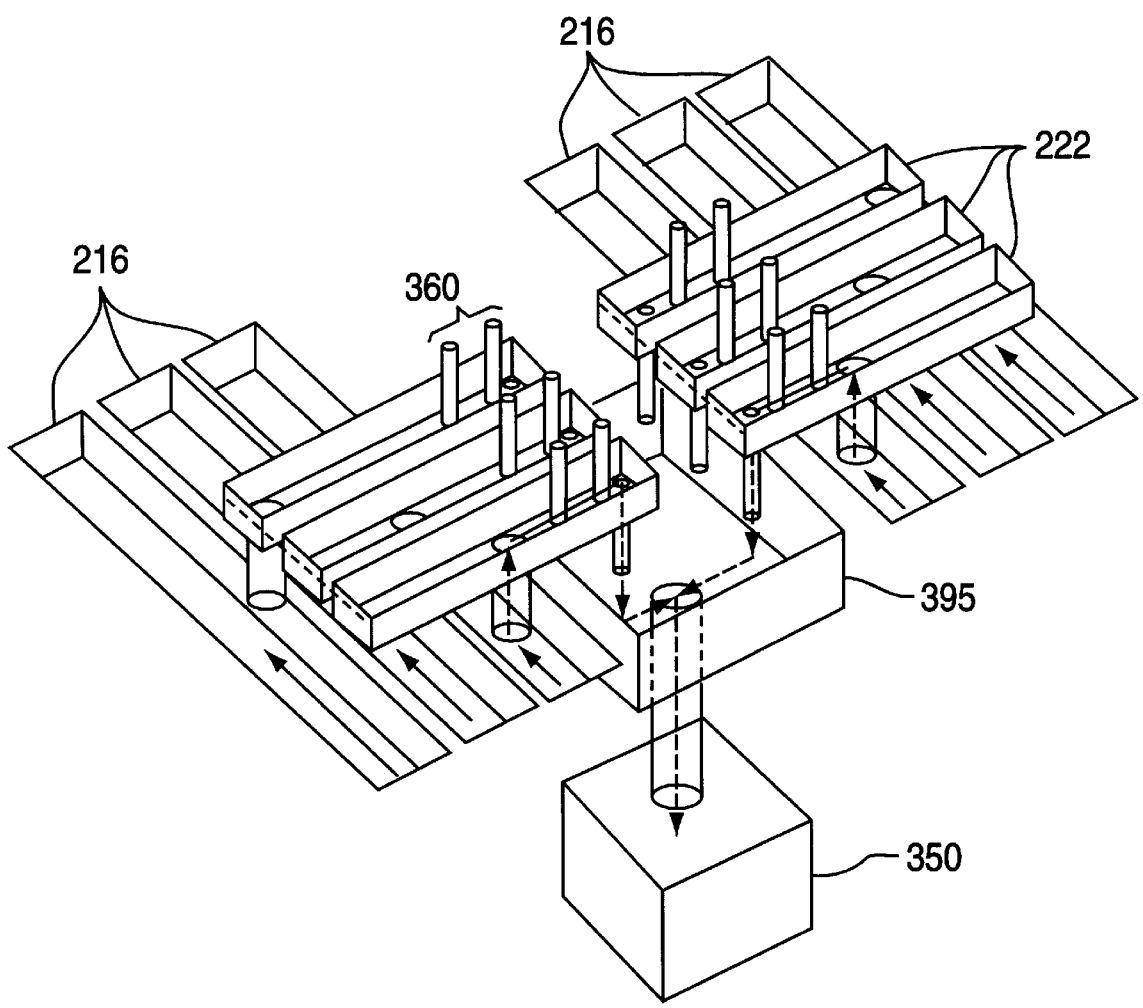
FIG. 16 shows the pathway of six channels that separately feed liquid into a reaction cell via a manifold.

This dilution effect can be effected with a manifold into which fluids are pumped from several sources, where the manifold is directly connected to a reaction cell 350 without the need for an intervening pump 360. Thus, the invention relates to a manifold of this type. Such a manifold, especially if placed at a level in the liquid distribution system that is displaced vertically from levels at which channels are densely arrayed and from the level of the reaction cells 350, can facilitate the arrangement of channels so that liquid from a greater number of reservoirs 200 can feed into a given reaction cell 350. FIG. 16 illustrates an embodiment wherein a manifold is used to facilitate the flow of liquid from six sources into a reaction cell 350. Distribution channels 222 are fed by liquid from horizontal feeder channel segments 216. Electrode-based pumps 360 (electrokinetic pumps) move liquid from the distribution channels 222 into a manifold 395. The capillary barrier function occurs at the outlets of the distribution channels 222 into the manifold 395. The manifold 395 drains into a reaction cell 350. The arrows in FIG. 16 indicate liquid flow pathways.

Note that in the illustrated embodiment, each of six solutions or solvents can be distributed to each of one hundred reaction cells 350 from first, second and third fluid reservoirs 200A, 200B, 200C, 200D, 210 and 220. Each of the ten second fluid reservoirs 210, or each of the ten third fluid reservoirs 220, can contain a separate solution or solvent intended for use in the ten associated reaction cells that can be addressed by the fluid reservoir. The four first fluid reservoirs 200A, 200B, 200C and 200D each can address any of the one hundred reaction cells 350. Further flexibility is available by flushing a given fluid reservoir with a new solution or solvent when appropriate during a protocol.

Note that the buffer channels 218 are optional. Buffer channels 218 can be avoided by providing for direct conduits from the outlets of distribution channels (which outlets are preferably capillary barriers 370) to the appropriate reaction cell 350.

The fluid reservoirs (e.g. first, second and third fluid reservoirs 200, 210 and 220) are typically simply expanded (i.e. wider) portions of the attached extension channels. Preferably, the liquid in the fluid reservoirs is maintained within ±10% of the difference between the floor of the fluid reservoir and its fill level. Replenishment of the liquid in the reservoirs can be continuous, step-wise on a defined schedule, or based on sensor data feed to controller 10. The drains 380 are designed to remove any excess fluid added to the reservoir by use of external pump 15. The fluid reservoirs, filled to the respective fill level, preferably have a volume from about 1 $\mu$l to about 5 $\mu$l, more preferably about 02.5 $\mu$l. Thus, in the more preferred embodiment, the volume in the fluid reservoirs will preferably be 2.5 $\mu$l±0.25 $\mu$l. Appropriate peristaltic pumps, such as the model number 205U multichannel cassette pump available from Watson-Marlow, Inc., can deliver liquid at rates as low as 1 $\mu$l per second. Such pumps need only be activated for a fraction of a second to adequately recharge a fluid reservoir.

The above discussion describes the distribution system as being formed with a feedthrough plate 300, distribution plate 310 and reaction cell plate 320. However, it will be clear that additional plates can be conveniently incorporated into the distribution system. For instance, a intermediate plate 330 is, in a preferred embodiment, permanently bonded underneath the distribution plate 310 and interposed between the distribution plate 310 and the reaction cell plate 320. The use of the intermediate plate 330 allows for much greater flexibility in the design of the channels that form the distribution system.

ii. The Pumps

Any pumping device of suitable dimensions can be used as the internal first pumps 360 or second pumps 361 in the liquid distribution system of the invention. Such pumps can include microelectromechanical systems (MEMS) such as reported by Shoji et al., "Fabrication of a Pump for Integrated Chemical Analyzing Systems," *Electronics and Communications in Japan*, Part 2, 70: 52–59, 1989 or Esashi et al., "Normally closed microvalve and pump fabricated on a Silicon Wafer," *Sensors and Actuators*, 20: 163–169, 1989 or piezo-electric pumps such as described in Moroney et al., "Ultrasonically Induced Microtransport," *Proc. MEMS*, 91: 277–282, 1991. Preferably, however, the first pumps 360 and second pumps 361 have no moving parts. Such first pumps 360 or second pumps 361 can comprise electrode-based pumps. At least two types of such electrode-based pumping has been described, typically under the names "electrohydrodynamic pumping" (EHD) and "electroosmosis" (EO). EHD pumping has been described by Bart et al., "Microfabricated Electrohydrodynamic Pumps," *Sensors and Actuators*, A21–A23: 193–197, 1990 and Richter et al., "A Micromachined Electrohydrodynamic Pump," *Sensors and Actuators*, A29:159–168, 1991. EO pumps have been described by Dasgupta et al., "Electroosmosis: A Reliable Fluid Propulsion System for Flow Injection Analysis," *Anal. Chem.*, 66: 1792–1798, 1994.

EO pumping is believed to take advantage of the principle that the surfaces of many solids, including quartz, glass and the like, become charged, negatively or positively, in the presence of ionic materials, such as salts, acids or bases. The charged surfaces will attract oppositely charged counter ions in solutions of suitable conductivity. The application of a voltage to such a solution results in a migration of the counter ions to the oppositely charged electrode, and moves the bulk of the fluid as well. The volume flow rate is proportional to the current, and the volume flow generated in the fluid is also proportional to the applied voltage. Typically, in channels of capillary dimensions, the electrodes effecting flow can be spaced further apart than in EHD pumping, since the electrodes are only involved in applying force, and not, as in EHD, in creating charges on which the force will act. EO pumping is generally perceived as a method appropriate for pumping conductive solutions.

EHD pumps have typically been viewed as suitable for moving fluids of extremely low conductivity, e.g., $10^{-14}$ to $10^{-9}$ S/cm. It has now been demonstrated herein that a broad range of solvents and solutions can be pumped using appropriate solutes than facilitate pumping, using appropriate electrode spacings and geometries, or using appropriate pulsed or d.c. voltages to power the electrodes, as described further below.

The electrodes of first pumps 360 and second pumps 361 used in the liquid distribution system preferably have a diameter from about 25 microns to about 100 microns, more preferably from about 50 microns to about 75 microns. Preferably, the electrodes protrude from the top of a channel to a depth of from about 5% to about 95% of the depth of the channel, more preferably from about 25% to about 50% of the depth of the channel. Usually, as a result the electrodes, defined as the elements that interact with fluid, are from about 5 microns to about 95 microns in length, preferably from about 25 microns about to 50 microns. Preferably, a pump includes an alpha electrode 364 (such as first electrode 360A) and a beta electrode 365 (such as third electrode 360B) that are preferably spaced from about 100 microns to about 2,500 microns apart, more preferably, from about 250 microns to about 1000 microns apart, yet more preferably, from about 150 microns to about 250 microns apart. The separation of electrodes is measured from the center points of the electrodes as they first protrude into their associated fluid channel. In a particularly preferred embodiment, a gamma electrode 366 (not shown) is spaced from about 200 microns to about 5,000 microns, more preferably from about 500 microns to about 1,500 microns, yet more preferably about 1,000 microns from the farther of the alpha electrode 364 and the beta electrode 365. In an alternative preferred embodiment, the pump has two additional electrodes comprising a gamma electrode 366 (not shown) and a delta electrode 367 that are spaced from about 200 microns to about 5,000 microns, more preferably from about 500 microns to about 1,500 microns, yet more preferably about 1,000 microns apart. Where the electrodes are located in fluid channels that have bends, the distances are measured along a line that defines the center line of the fluid channel. In contexts where relatively low conductivity fluids are pumped, voltages are applied across the alpha electrode 364 and the beta electrode 365, while in contexts where relatively more highly conductive fluids are pumped the voltage is induced between gamma electrode 366 and one of alpha electrode 364, beta electrode 365 or delta electrode 367. The latter circumstance typically applies for solvents traditionally pumped with EO pumping, although this invention is not limited to any theory that has developed around the concepts of EHD or EO pumping. No firm rules dictate which electrode combination is appropriate for a given solvent or solution; instead an appropriate combination can be determined empirically in light of the disclosures herein.

The voltages used across alpha and beta electrodes 364 and 365 when the pump is operated in d.c. mode are typically from about 50 V to about 2,000 V, preferably from about 100 V to about 750 V, more preferably from about 200 V to about 300 V. The voltages used across gamma electrode 366 and alpha, beta or delta electrodes 364, 365 or 367 when the pump is operated in d.c. mode are typically from about 50 V to about 2,000 V, preferably from about 100 V to about 750 V, more preferably from about 200 V to about 300 V. The voltages used across alpha and beta electrodes 364 and 365 when the pump is operated in pulsed mode are typically from about 50 V to about 1,000 V, preferably from about 100 V and about 400 V, more preferably from about 200 V to about 300 V. The voltages used across gamma electrode 366 and the alpha, beta or gamma electrode 364, 365 or 367 when the pump is operated in pulsed mode are typically from about 50 V to about 1,000 V, preferably from about 100 V and about 400 V, more preferably from about 200 V to about 300 V. Preferably, the ratio of pumping to current will be such that no more than about one electron flows into the solution adjacent to a first pump 360 or second pump 361 for every 1,000 molecules that move past the pump 360 or 361, more preferably for every 10,000 molecules that move past the pump 360 or 361, yet more preferably for every 100,000 molecules that move past the pump 360 or 361.

It is believed that an electrode-based internal pumping system can best be integrated into the liquid distribution system of the invention with flow-rate control at multiple pump sites and with relatively less complex electronics if the pumps are operated by applying pulsed voltages across the electrodes. FIG. 7 shows an example of a pulse protocol where the pulse-width of the voltage is $T_1$ and the pulse interval is $T_2$. Typically, $T_1$ is between about 1 μs and about 1 ms, preferably between about 0.1 ms and about 1 ms. Typically, $T_2$ is between about 0.1 μs and about 10 ms, preferably between about 1 ms and about 10 ms. A pulsed voltage protocol is believed to confer other advantages including ease of integration into high density electronics (allowing for hundreds of thousands of pumps to be embedded on a wafer-sized device), reductions in the amount of electrolysis that occurs at the electrodes, reductions in thermal convection near the electrodes, and the ability to use simpler drivers. The pulse protocol can also use pulse wave geometries that are more complex than the block pattern illustrated in FIG. 7.

Another, procedure that can be applied is to use a number of electrodes, typically evenly spaced, and to use a travelling wave protocol that induces a voltage at each pair of adjacent electrodes in a timed manner that first begins to apply voltage to the first and second electrodes, then to the second and third electrodes, and so on. Such methods are described in Fuhr et al., *J. Microelectrical Systems*, 1: 141–145, 1992. It is believed that travelling wave protocols can induce temperature gradients and corresponding conductivity gradients that facilitate electric field-induced fluid flow. Such temperature gradients can also be induced by positioning electrical heaters in association with the electrode-based first pumps 360 and second pumps 361.

While not wishing to be restricted to theory, several theoretical concepts are believed to play a role in the mechanics of EHD pumping. The forces acting on a dielectric fluid are believed to be described by:

$$\vec{F} = q\vec{E} + \vec{P} \cdot \nabla \vec{E} - 1/2 E^2 \nabla \epsilon + \nabla \left[ 1/2 \rho \frac{\partial \epsilon}{\partial \rho} E^2 \right]$$

where F is the force density, q is the charge density, E is the applied field, P is the polarization vector, ε is the permittivity and ρ is the mass density. Of the terms in the equation, the first and third are believed to be the most significant in the context of EHD pumping of fluids. The first term (qE) relates to the Coulomb interaction with a space-charge region. The third term (½E²≡ε) relates to the dielectric force which is proportional to the gradient in permittivity.

In low fields, i.e., the Ohmic region where current is linearly proportional to voltage, the primary source of charges that will be acted upon by the electric field are believed to be primarily due to ions from additives, ions from impurities and ions formed by autodissociation of molecules in the fluid. In intermediate fields, i.e. from beyond the Ohmic region to about 2 V/μm, the charges are believed to be primarily formed by dissociation and electrolytic processes in the fluid. In higher fields, the charges are believed to be determined by injection processes at the electrodes, which electrodes inject homocharges.

For the purposes of this application, positive (+) flow shall be flow in the direction of the negative electrode, and negative (−) flow shall be flow in the direction of the positive electrode.

In a preferred embodiment of the invention, the controller 10 has a device for storing data and stores the values of voltage and polarity suitable for pumping a number of solvents.

Experimental results indicate that the properties of fluid flow (like direction of flow) correlate well with the solvent's ability to stabilize and solvate the charged species injected or induced from the electrodes. The direction of flow is believed to be determined by the preference of the solvent to solvate either positive charges or negative ions. This solvation preference is believed to imply a greater shell of solvent molecules that will be dragged in an electric field, creating fluid movement, when a field is applied to the electrodes of a first pump 360 or a second pump 361. For example, a preferred salvation of positive charges correlates with a preference for fluid flow from the anode to the cathode (i.e., the positive direction). The degree of such a solvation preference for a solvent is believed to depend on the ability of the molecules within the solvent to accept or donate hydrogen bonds. In one aspect of the invention, for liquids whose pumping behavior has not yet been characterized, the controller will store initial pumping parameters estimated using the Linear Solvation Energy relationships established by R. W. Taft and co-workers. See, Kamlet et al., *J. Org. Chem.*, 48: 2877–2887, 1983 and Kamlet et al., *Prog. Phys. Org. Chem.*, 13: 485, 1981. These workers have categorized solvents in terms of the following parameters: $\pi$, the ability of the solvent to a stabilize a charge or dipole by virtue of its dielectic properties; $\alpha$, the hydrogen bond donating ability of the solvent; and $\beta$, the hydrogen bond accepting ability of the solvent. These parameters are more fully defined in the above-cited Kamlet et al. publications, from which these definitions are incorporated herein by reference.

Using a one mm capillary of circular cross-section, a pair of 50 micron rod-shaped, platinum electrodes perpendicularly inserted to a depth of 500 microns into the capillary with a 500 micron separation powered by a 400 V field, the direction of flow was determined for several solvents. The direction of flow and the $\alpha$, $\beta$, $\pi$, $\epsilon$ and dipole moment values are as follows:

| Solvent | direction | α | β | π | ε | dipole moment |
|---|---|---|---|---|---|---|
| ethanol | − | 0.83 | 0.77 | .54 | 24.55 | 1.69 |
| tetrahydrofuran | + | 0 | 0.55 | .58 | 7.58 | 1.75 |
| chloroform | − | 0.44 | 0 | .58 | 4.806 | 1.01 |
| acetone | + | 0.08 | 0.48 | .71 | 20.7 | 2.69 |
| methanol | − | 0.93 | 0.62 | .6 | 32.7 | 2.87 |
| 2-propanol | +/− | 0.76 | 0.95 | .48 | 19.92 | 1.66 |
| acetonitrile | + | 0.19 | 0.31 | .75 | 37.5 | 3.92 |
| N-methyl-pyrrolidone | + | 0 | 0.77 | .92 | 32.0 | 4.09 |
| diethyl ether | + | 0 | 0.47 | 0.27 | 4.335 | 1.15 |

-continued

| Solvent | direction | α | β | π | ε | dipole moment |
|---|---|---|---|---|---|---|
| 1,2 dichloroethane | − | 0 | 0 | 0.81 | 10.36 | 1.2 |
| DMF | + | 0 | 0.69 | .88 | 36.71 | 3.86 |

It is believed that the $\alpha$ and $\beta$ values reflect the ability of the solvent under an electric field to solvate a negative or positive charged species, with the magnitude of $\alpha-\beta$ correlating with (−) flow, and the magnitude of $\beta-\alpha$ correlating with (+) flow. According to one aspect of the invention, the preferred direction of flow of a liquid can be reversed from that predicted as above if the fluid has a difference in $\alpha$ and $\beta$ values that is small but not zero and the electrode pair used creates an asymmetric field, such that the acting force on either positive or negative charged species is enhanced. One such electrode pair has an alpha electrode 364 with a sharp point pointing in the direction of intended flow and a beta electrode 365 that lines the walls of the channel in which it is located. Such an electrode-based pump, fabricated in a 1 mm capillary, has been shown to be effective to pump 2-propanol in the direction pointed to by the alpha electrode 364 either when the voltage applied to the electrodes implied a (−) direction of flow or, with somewhat weaker flow, when the voltage applied to the electrodes implied a (+) direction of flow.

The pumping parameters of a liquid can be calibrated using a plug of the liquid disposed in a capillary that has an electrode-based pump and is angled uphill. If optical devices are associated with the capillary for monitoring the position of the plug, the velocity of pumped flow uphill and the velocity of gravity driven downhill motion can be measured. With these velocities and the angle of the capillary, the pressure applied to the liquid can be calculated. (Fluid resistance, $R=(8\cdot\mu\cdot l)/\pi r^4$, where $\mu$ defines viscosity and $l$=the length of the fluid plug; Pressure, $P=RA(v_{up}-v_{down})$, where A=cross-sectional area). The efficiency of the pump can also be calculated ($\eta=(q\cdot\rho\cdot Q\cdot N_A)/m\cdot|$, where q=charge of $e^-$, $\rho$=density of liquid, $Q$=flow rate=$V_{up}\cdot A$, m=mass of liquid, and $|$=current). The velocities can be measured with multiple single point observations of the location of either the front or rear interfaces of the plug using fixed LEDs and optical detectors or in a continuous mode using a light and a silicon photodiode position sensor, such as a SL15 or SC10 position sensor available from UDT Sensors, Inc., Hawthorne, Calif. With the latter method, the correlation between the signal produced at the difference amplifier connected to the position sensor must be calibrated prior to experimental use.

The pumping parameters for a number of solvents have been determined in the 1 mm capillary described above, as follows:

| Solvent | Flow rate, Q μl/sec | Pressure, P N/m² | electrical efficiency, η, molecules/e⁻ |
|---|---|---|---|
| acetone | 14.56 | 16.33 | $1.9 \times 10^6$ |
| methanol | 24.46 | 26.32 | $9.7 \times 10^4$ |
| i-propanol | 16.39 | 74.89 | $4.2 \times 10^5$ |
| diethyl ether | 18.44 | 20.45 | $5.8 \times 10^8$ |
| 1,2 dichloroethane | 14.24 | 46.55 | $2.9 \times 10^7$ |

Another aspect of pumping is the observation that fluids that are resistant to pumping at a reasonable field strength can be made more susceptible to electrode-based pumping by adding a suitable flow-enhancing additive. Preferably, the flow-enhancing additive is miscible with the resistant fluid and can be pumped at high pressure, P, high flow rate, Q, and good electrical efficiency, η (i.e., molecules pumped per electron of current).

Generally, the flow-enhancing additive comprises between about 0.05% w/w and about 10% w/w of the resistant fluid, preferably between about 0.1% w/w and about 5% w/w, more preferably between about 0.1% w/w and about 1% w/w. Carbon tetrachloride and cyclohexane do not pump using the electrode pump situated in a capillary described above at a voltage of 2,000 V. By adding 0.5% w/w acetone or methanol as a flow-enhancing additive, both of these fluids can be pumped at a voltage of 1,000 V. In some cases, it is desirable to reverse the preferred flow direction of a liquid by mixing with it a flow-enhancing additive that strongly pumps in the desired direction. In all cases, additives are selected on the basis of their pumping characteristics and their compatibility with the chemistries or other processes sought to be achieved in the liquid distribution system.

The electrode-based pumps of the invention can be operated to act as a valve to resist flow in a certain direction by operating the pumps to counter the unwanted flow. To power the electrode-based pumps, one or more digital drivers, consisting of, for example, a shift register, latch, gate and switching device, such as a DMOS transistor, permits simplified electronics so that fluid flow in each of the channels can be controlled independently. Preferably, each digital driver is connected to multiple switching devices that each can be used to control the pumping rate of a separate electrode-based pump.

Features of other distribution systems described in this application can be applied to this embodiment, irrespective of under which subheading they are described.

C. Controller

The controller 10 will typically be an electronic processor. However, it can also be a simpler device comprised of timers, switches, solenoids and the like. The important feature of controller 10 is that it directs the activity of the first pumps 360 and second pumps 361 and, optionally, the activity of external pumps 171. A circuit of thin film transistors (not shown) can be formed on the liquid distribution system to provide power to the wells via leads and electrodes, and to connect them with the driving means such as the controller 10, so as to move liquids through the array. Pins can be formed substrate which are addressable by logic circuits that are connected to the controller 10 for example.

D. Reaction Cells and Reaction Cell Plate

Reaction cells 350 are typically depressions formed in the upper layers of a reaction cell plate 320. The drain 355 to a reaction cell 350 can be open at the bottom of the reaction cell 350, in which case drainage is controlled kinetically and by negative pressure from the connected channels. Alternatively, the drain 355 may be adjacent to the reaction cell 350 and open at a height greater than the height of the floor of the reaction cell 350. In this case, flushing volumes, which are substantial volumes relative to the volume of the reaction cell but minuscule in absolute amount, are passed through the reaction cell 350 to remove all of a given reactant previously directed into the reaction cell 350.

Another way by which the reaction cell 350 can be controllably drained is to use a bottom drain 355 having an outlet channel that has constrictor, such as one of the constrictors described above with reference to the second preferred embodiment.

Drains are optional, since in some uses the amount of liquid moved into a reaction cell 350 is less than the reaction cell's volume. If drains are absent, however, vents are required. Vents for the reaction cells 350 are appropriate in other contexts.

The reaction cell plate can be reversibly bonded to the adjacent plate by, for instance, assuring that the two surfaces are smoothly machined and pressing the two plates together. Or, for example, a deformable gasket, such as a silcone rubber, Teflon (polyperfluoroethylene), polyethylene or an elastomeric film (such as a natural rubber, ABS rubber, or polyurethane elastomer film) gasket is interposed between the plates. One way to maintain a force adhering the plates against the gasket is to have a number of vacuum holes cut through the bottom plate and the gasket and applying a vacuum at these locations. Generally, the seal should be sufficient so that the pump used to form the vacuum can be shut down after initially forming the vacuum. The gasket is preferably from about 0.05 mils to about 2 mils, more preferably from about 0.05 mils to about 1 mils, yet more preferably from about 0.1 mils to about 0.3 mils in thickness. In selecting a gasket thickness, it will be recognized that a thin gasket is preferred to minimize the open volumes created by the gasket. However, other factors, such as the limitations of the gasket-forming method, the flatness of the top surface of a gasket as produced by a given method, the hardness of the gasket material, and the clamping pressure that can be applied to the substrates that are to be sealed by the gasket, will affect the choice of gasket thickness.

The gasket which is used to reversibly seal the plate to an instrument that functions with the plate can be attached to the plate, leaving openings for the cells and other structures, as needed. One method of attaching the gasket is screen-printing. The printed gasket can be made of silicone or another chemically-resistant, resilient material. Preferably, the gasket is made of a mixture of (a) a silicone rubber-forming material such as that available under the Sylgard 184™ brand from Dow Corning, Midland, Mich. or MDX4-4210™ also from Dow Corning and (b) an inert filler, such as the amorphous fumed silicon sold as M-5 grade Cab-o-sil™ (Cabot Corp., Boston, Mass.). Sylgard 184 and MDX4-4210 are sold in two components. One component is an emulsion containing particles of silcone rubber and a polymerization catalyst and the second component is a preparation of a bi-valent monomer, which monomer serves to crosslink and thereby cure the silicone rubber. Component one of MDX4-4210, i.e. the "elastomer component," is made up of dimethylsiloxane polymer, reinforcing silica, and a platinum catalyst. Component two of MDX4-4210, the "curing agent," also contains dimethylsiloxane polymer, in addition to a polymerization inhibitor, and a siloxane crosslinker. The components are generally mixed according to the manufacturer's recommendations. For example, for MDX4-4210, ten parts by weight of emulsion, i.e. elastomer, are mixed with one part of monomer solution, i.e. curing agent.

As examples of the use of inert fillers, about 7.5% by weight of M-5 grade Cab-o-sil can be added to the Sylgard 184, or about 2–3% by weight of M-5 grade Cab-o-sil can be added to the MDX4-4210. Filler can serve to thicken the pre-polymerized composition to improve its screen printing properties. Gasket materials can generally be cured at room temperature, or curing, can be accelerated with, for example, heat. Prior to curing, the gasket-forming material is capable of flow, though generally viscous flow, which flow is sufficient to facilitate the screen printing process. The gasket-forming material is also sufficiently adhesive to adhere either to the plate to which it will be applied or to an underlying first layer of gasket material.

In one version of the screen printing process, a first layer of gasket material is printed onto the plate and then cured. After this first printing, a second layer of gasket material is overlaid on the first, a smooth platen of appropriate shape (generally very flat) is overlaid upon the printed gasket material so that a uniform weight is applied to the printed gasket material (while taking precautions to prevent destructive adhesions of gasket material to the platen such as described further below), and the gasket material is cured. The use of two printings of gasket-forming material helps form a foundation of gasket material prior to the smoothing process effected after the second printing and to achieve the needed smoothness and uniform thickness of the sealing surface of the gasket. To achieve this needed smoothness and uniform thickness, it is important to apply a sufficiently uniform pressure to the gasket during a final curing process. This pressure should be selected to be, for the particular gasket-applying process, sufficiently high to create the needed uniformity during the curing process, but not so high as to overly compress cured portions of gasket material such that upon release of the pressure these portions re-expand and create a non-uniform seal thickness. A single print process can also be used, and such a single print process is generally preferred since it is simpler and more readily applied to a production process. In a single print process, which is described further below, a platen is applied directly after the first (and only) printing of gasket material, and prevented from settling down too far or too unevenly by mechanical stops.

Figure 15A:
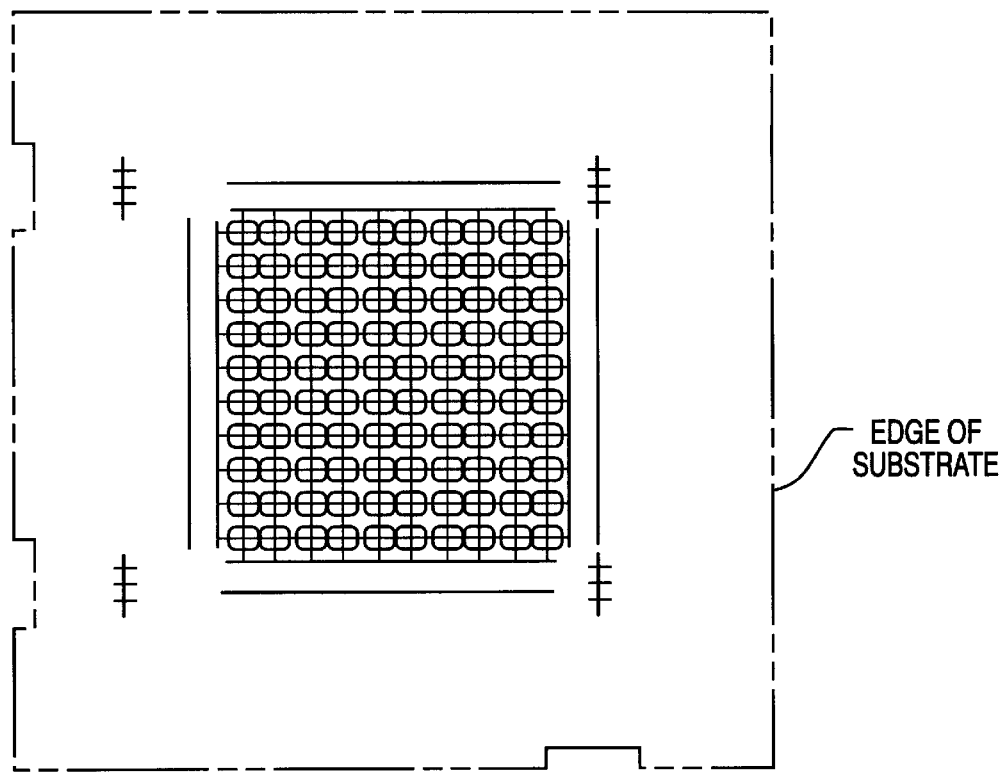
FIGS. 15A and 15B illustrate a portion of a gasket print pattern.
Figure 15B:
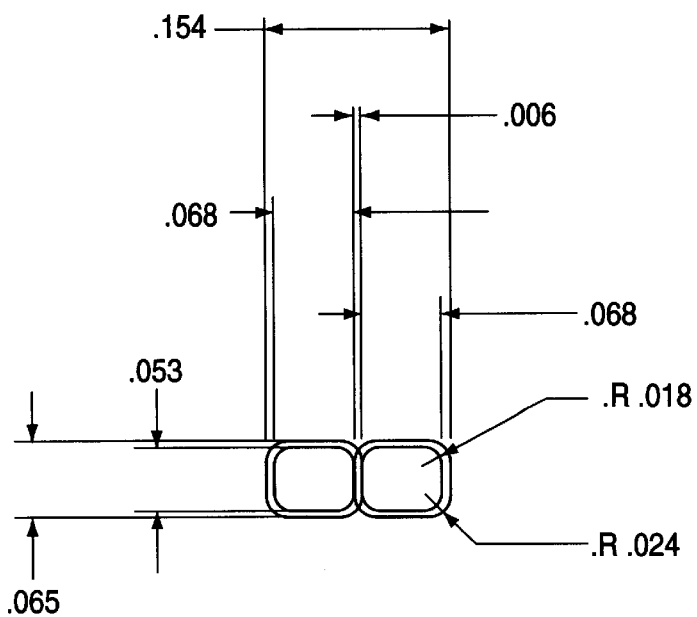

Preferably, the width of each print feature on the screen is uniform, as width non-uniformities increase the probability of a thickness non-uniformity at the end of the process. FIG. 15B shows an illustrative print screen pattern, wherein gasket material is applied between the closely spaced (here, for example 6 mils) lines. After printing and processing, the applied gasket patterns are broadened. For example, in applications using the two-print process and 6 mil wide pattern on the print screen, an 18 mils wide pattern has been produced. In FIG. 15A, the fifty figure eight patterns outlined in dark lines represent the gasket about one hundred reaction wells on a reaction cell plate, with the individual wells (not shown) located within the two openings in the illustrated figure eight patterns. In FIG. 15B is illustrated a print screen pattern used to generate one of the figure eight patterns. In another embodiment, each individual reaction well has an O-shaped gasket pattern about it. This latter embodiment avoids the gasket boundary shared by two reaction wells in the pattern of FIGS. 15A and 15B. This shared boundary can be more susceptible to non-uniformities than the other boundaries of the pattern. The dimensions illustrated in FIG. 15B are in inches.

Illustrative two-print protocol: The plate, in this case a 2×2 inch glass plate, is cleaned in a Class 10,000 or, preferably, cleaner cleanroom environment. The plate is inspected under a microscope for lint and deposits. These are removed with tweezers and by a stream of propanol or other solvent. The plate is wiped with a lint-free cloth and vapor cleaned with ethanol. After drying, the plate can be stored in a container. The gasket forming material is prepared by degassing the material (e.g., MDX 4-4210™) under vacuum. Care is taken to align the register between the plate and the print screen. The plate can be aligned with three-pin registry with the notches indicated at the edges of the plate illustrated in FIG. 15A. The gasket pattern is then printed on the plate, the plate is isolated in a clean container, and the gasket is cured by placing the container in a 70° C. oven for 4 hours. Then, the same gasket pattern is overlaid on the first. A thin, preferably transparent, plastic film (for example, a 3 mils thick polyester film) coated with a mold release (for example, 3% wt/v aqueous sodium lauryl sulfate) is layered on top of the printed gasket pattern. Then, a flat, smooth platen is set on top of the release film to evenly apply a weight, for example 2½ lbs., onto the printed gasket pattern. Alternatively, instead of using the film, a mold release agent such as a surfactant can be directly applied to the platen to assure that it does not adhere to the gasket material. The gasket is then cured while the evenly distributed weight is applied. For testing, the release film is carefully removed, and the gasket examined under a microscope for defects. A clean, smooth plate can be placed on top of the gasket, and a clamping pressure of, for example, 20 lbs. is applied to the gasket pattern of FIG. 15A. In a successful print, a contacting interface for each seal segment should be visible. The gasket should be stored in contact with a release film.

Illustrative single-print protocol: The plate is prepared as described above, and a gasket is printed on the plate as described above, taking special care that the gasket-forming material is evenly applied by the print screen. Immediately after this single printing, a transparent, plastic film, which is coated with a release coating, is layered over the printed pattern, and a smooth, flat platen is positioned over the film and the underlying printed pattern. The platen is impressed upon the pattern until it is met by mechanical stops that hold the platen at a uniform height above the plate. The gasket is then cured while the platen is in place. The gasket can be tested and stored as described above.

The screen used in the printing can be formed for example using conventional photolithographic means. Thus, it can be the same type of screen as those used in the manufacture of printed circuit boards. The screen is for example woven from 0.9 mil stainless steel wire. The weave pattern is preferably oriented at about a 45 degree angle from the printing (squeegee) direction. The photolithographic emulsion on which the pattern is made in can be, for example, 2.5 mils thick. With the 6 mil screen pattern width illustrated in FIG. 15B and the 2.5 mil screen pattern depth, the gasket width after curing is typically about 18 mil and the thickness of the seal is typically about 1.3 mils. In printings using MDX 4-4210, a typical product gasket has a hardness of about 65 durometer.

The width and thickness of the gasket can be varied by, for example, varying the dimensions of the screen pattern, varying the size of emulsion particles in the polymeric component of the gasket-forming material, varying the weight applied in the curing process, and adding additives to the gasket-forming material such as an inert filler.

It should be recognized that the gasket-forming process, while preferably applied to the flat plates contemplated in the preferred embodiments of the liquid distribution system, can also be applied to any other surfaces to which a complementary surface can be sealed via the gasket. Generally, such other surfaces will be sufficiently smooth so as to facilitate printing of the gasket and sealing to the complementary surface.

Alternatively, a multi-step compression-molding process that utilizes photolithography can be applied. First, the top surface of the plate, on which generally cells and other structures have been formed, is coated with a photoresist. Preferably, the photoresist layer is about 1 mils in thickness. The photoresist layer is treated by standard photolithography techniques to remove photoresist from those areas (the "gasket areas"), away from the apertures of the cells, where gasket material is desired. A layer of a flowable gasket material that can be cured to a resilient, elastomeric solid is applied. A platen having a polished surface, for instance a polished glass surface, is placed above the gasket material and pressure is applied to push the gasket material into the gasket areas and substantially clear the gasket material from the photoresist-coated areas. The gasket material is now cured. The photoresist is then dissolved, leaving the plate with a patterned gasket. The gasket material is substantially cleared if it is sufficiently cleared to allow the underlying photoresist to be dissolved.

In this process, the gasket material is any elastomeric material that is suitable for use in the above-described compression molding technique, that is, when cured, compatible with the chemistries that are to be practiced in the plate on which the gasket is formed, and that is, when cured, resistant to the solvents used to remove the photoresist. The gasket material is preferably silicone, such as RTV type silicone rubber (e.g., Silastic J or Sylgard 184 available from Dow Corning, Midland, Mich.). A low viscosity RTV mix such as Sylgard 184 is preferred. The photoresist can be a film-type photoresist such that typically the structures on the plate will not be filled during the compression-molding process or a liquid-type photoresist such that the structures will temporarily be filled during the compression-molding process and etched away at the completion of the process. In some instances, in this gasket-forming method or in other gasket-forming methods, it is desirable to treat the plate, prior to the application of the photo-resist, with a primer for promoting the adhesion of the gasket material, such as 1200 RTV Prime Coat from Dow Corning, Midland, Mich. In this gasket-forming method or in other gasket-forming methods, the plate can also be roughened to promote the adhesion of the gasket material to the plate. For example, 5 micron roughness can be produced by lapping. The platen is preferably treated with a release-promoter, or a release promoter is incorporated into the gasket material, as it is in Silastic J silicone rubber. The compression-molding process can leave thin residues of gasket material at unwanted locations. These residues are laser cut away from the plate or, in some cases, are removed using a timed exposure to a solvent that dissolves the thin film of exposed gasket material residue without having substantial effect on the thicker layer of gasket material found at desired locations.

Fluid exiting the bottom of the reaction cell plate 320 can, for instance, simply collect in a catch pan or it can diffuse into a porous substrate such a sintered glass, glass wool, or a fabric material. Alternately, a fifth plate 340 is attached to the underside of the reaction cell and has channels that connect the outlets of the reaction cells 350 to individual collection reservoirs from which fluid can be sampled. For instance, the fifth plate 340 is wider than the reaction cell plate 320 and the collection reservoirs are located at the top surface of the fifth plate 340 in the area not covered by the reaction cell plate 320.

Preferably, synthetic processes conducted in the reaction cells 350 of the liquid distribution system will take place on insoluble supports, typically referred to as "beads", such as the styrene-divinylbenzene copolymerizate used by Merrifield when he introduced solid phase peptide synthetic techniques. Merrifield, *J. Am. Chem. Soc.* 85: 2149, 1963. See, also Barany et al., "Recent Advances in Solid-Phase Synthesis," in *Innovation and Perspectives in Solid Phase Synthesis: Peptides, Polypeptides, and Oligonucleotides*, Roger Epton, Ed., collected papers of the 2nd International Symposium, 27–31, August 1991, Canterbury, England, p. 29. These supports are typically derivatized to provide a "handle" to which the first building block of an anticipated product can be reversibly attached. In the peptide synthesis area, suitable supports include a p-alkoyxbenzyl alcohol resin ("Wang" or PAM resin) available from Bachem Bioscience, Inc., King of Prussia, Pa.), substituted 2-chlorotrityl resins available from Advanced Chemtech, Louisville, Ky., and polyethylene glycol grafted poly styrene resins (PEG-PS resins) are available from PerSeptive Biosystems, Framingham, Mass. or under the tradename TentaGel, from Rapp Polymere, Germany. Similar solid phase supports, such as polystyrene beads, are also used in the synthesis of oligonucleotides by the phosphotriester approach (see Dhristodoulou, "Oligonucleotide Synthesis: Phosphotriester Approach," in *Protocols for Oligonucleotide Conjugates*, S. Agrawal, Ed., Humana Press, New Jersey, 1994), by the phosphoramidite approach (see Beaucage, "Oligodeoxynucleotide Synthesis: Phosphoramidite Approach," in *Protocols for Oligonucleotide Conjugates*, S. Agrawal, Ed., Humana Press, New Jersey, 1994), by the H-phosponate approach (see Froehier, Oligodeoxynucleotide Synthesis: H-Posphonate Approach," in *Protocols for Oligonucleotide Conjugates*, S. Agrawal, Ed., Humana Press, New Jersey, 1994), or by the silyl-phosphoramidite method (see Damha and Ogilvie, Oligodeoxynucleotide Synthesis: "Silyl-Phosphoramidite Method," in *Protocols for Oligonucleotide Conjugates*, S. Agrawal, Ed., Humana Press, New Jersey, 1994). Suitable supports for oligonucleotide synthesis include the controlled pore-size glass (cpg) and polystyrene supports available from Applied Biosystems, Foster City, Calif. Solid supports are also used in other small molecule and polymeric organic syntheses, as illustrated in oligocarbamate synthesis for organic polymeric diversity as described by Gorden et al., *J. Medicinal Chem.* 37: 1385–1401, 1994.

Preferably, the reaction cells 350 are rectangular with horizontal dimensions of about 400 microns to about 1200 microns, more preferably about 500 microns to about 1000 microns, yet more preferably about 1000 microns, and a depth of about 200 microns to about 400 microns. Where beads will be used in the reaction cells 350, the depth of the reaction cells 350 is preferably at least about 50 microns greater than the swelled diameter of the beads. The support beads typically used as in solid-phase syntheses typically have diameters between about 50 microns and about 250 microns, and reactive site capacities of between about 0.1 mmoles/g and about 1.6 mmoles/g. Typically, between about 1 and about 10 of such beads are loaded into a reaction cell 350 to provide a desired capacity of between about 1 nmole and about 10 nmole per reaction cell 350. Recently, beads have become available that have a diameter that ranges between about 200 microns and about 400 microns, depending on the solvent used to swell the beads and the variation in size between the individual beads, and a reactive site capacity of between about 5 nmole and about 20 nmole per bead have become available. These large beads include the beads sold by Polymer Laboratories, Amhearst, Mass. Desirable reactive site functionalities include halogen, alcohol, amine and carboxylic acid groups. With these large beads, preferably only one bead is loaded into each reaction cell 350.

Another option for creating a solid support is to directly derivatize the bottom of the reaction cell 350 so that it can be reversibly coupled to the first building block of the compound sought to be synthesized. The chemistry used to do this can be the same or similar to that used to derivatize controlled pore glass (cpg) beads and polymer beads. Typically, the first step in this process is to create hydroxyl groups (if they do not already exist on the support) or amino groups on the support. If hydroxyl groups exist or are created, they are typically converted to amino groups, for instance by reacting them with gamma-aminopropyl triethoxy silane. Flexible tethers can be added to the amino groups with cyclic acid anhydrides, reactions with polymerized alkylene oxides and other methods known to the art. Examples of such methods are described in Fields et al., "Synthetic Peptides: A User's Guide," W. H. Freeman and Co., Salt Lake City, Utah, 1991.

Methods of creating reactive sites include, for the case where the reaction cell plate 320 is made of plastic, exposing the bottom of the reaction cells 350 to a reactive plasma, such as that created by a glow-discharge in the presence of ammonia or water, to create $NH_2$ groups. Such procedures are described in "Modification of Polymers," Carraher and Tsuda, eds., American Chem. Soc., Washington, DC, 1980. Another method, useful with glass, ceramic or polymeric substrates, is depositing a film of silicon monoxide by vapor deposition at low temperature to create hydroxyl functionalities. Glass surfaces can be treated with alkali, for instance with KOH or NaOH solutions in water or water/alcohol mixtures, to expose hydroxyl functional groups. Non-annealed borosilicate glass surfaces, including coatings of non-annealed borosilicate glass created by chemical vapor deposition, can be etched, for instance with hydrofluoric acid dissolved in water, to dissolve the regions that are rich in boron, which process creates a porous structure with a large surface area. This porous structure can be treated with alkali to expose hydroxyl groups. The degree of reactive site substitution on such surfaces is preferably at least about 83 nmoles per $cm^2$, more preferably at least about 124 nmoles per $cm^2$ (implying a substitution in 500 micron by 500 micron reaction cell 350 of at least about 0.31 nmole), yet more preferably at least about 256 nmoles per $cm^2$.

The above described methods for using the bottom of the reaction cells 350 as a solid support can be supplemented by methods that increase the surface area of the bottom of the reaction cells 350. One method is to create columnar structures of silicon monoxide, for instance by thermal evaporation of $SiO_x$. Another such method is to insert into the reaction cells fabrics, such as non-woven glass or plastic (preferably fiberglass or polypropylene fiber) fabrics and plasma treating the fabric to create reactive sites.

Another method uses spin-on glass, which creates a thin film of nearly stoichiometric $SiO_2$ from a sil-sesquioxane ladder polymer structure by thermal oxidation. Sol-gel processing creates thin films of glass-like composition from organometallic starting materials by first forming a polymeric organometallic structure in mixed alcohol plus water and then careful drying and baking. When the sol-gel system is dried above the critical temperature and pressure of the solution, an aerogel results. Aerogels have chemical compositions that are similar to glasses (e.g. $SiO_2$) but have extremely porous microstructures. Their densities are comparably low, in some cases having only about one to about three percent solid composition, the balance being air.

E. Fabrication of Plates, Channels, Reservoirs and Reaction Cells

The liquid distribution systems of the invention can be constructed a support material that is, or can be made, resistant to the chemicals sought to be used in the chemical processes to be conducted in the device. For all of the above-described embodiments, the preferred support material will be one that has shown itself susceptible to microfabrication methods that can form channels having cross-sectional dimensions between about 50 microns and about 250 microns, such as glass, fused silica, quartz, silicon wafer or suitable plastics. Glass, quartz, silicon and plastic support materials are preferably surface treated with a suitable treatment reagent such as a siliconizing agent, which minimize the reactive sites on the material, including reactive sites that bind to biological molecules such as proteins or nucleic acids. In embodiments that require relatively densely packed electrical devices, a non-conducting support material, such as a suitable glass, is preferred. Corning borosilicate glass, particularly Corning 7740 borosilicate glass, available from Corning Glass Co., Corning, N.Y., are among the preferred glasses.

The liquid distribution system of the invention is preferably constructed from separate plates of materials on which channels, reservoirs and reaction cells are formed, and these plates are later joined to form the liquid distribution system. This aspect of the invention is described in some detail with respect to the hydrologic liquid distribution system. Preferably, the reaction cell plate, e.g. reaction cell plate 320, is the bottom plate and is reversibly joined to the next plate in the stack. The other plates forming the distribution system, which preferably comprise two to three plates are preferably permanently joined. This joinder can be done, for instance, using adhesives, or techniques such as glass-glass thermal bonding.

One preferred method of permanently joining the plates is to first coat the plate with a layer of glass glaze generally having a thickness between about 50 microns and about 500 microns, more preferably between about 75 microns and about 125 microns. The above thicknesses contemplate that substantial amounts of channel structure will be formed in the glaze layer. Otherwise, the glaze generally has a thickness between about 1 microns and about 100 microns, more preferably between about 10 microns and about 25 microns. These methods are preferably applied to join glass plates. Suitable glazes are available from Ferro Corp., Cincinnati, Ohio. The glazed plate is treated to create channels, reservoirs, or reaction cells as described below. The glazed plate is positioned against another plate, which preferably is not glazed, and the two plates are heated to a temperature of about the softening temperature of the glaze or higher, but less than the softening temperature for the non-glaze portion of the plates.

Another preferred method of permanently joining glass plates uses a field assisted thermal bonding process. It has now been discovered that glass-glass sealing using field assist thermal bonding is possible despite the low conductivity of glass if a field assist bonding material is interposed between the plates to be bonded.

To the top or bottom surface of one glass plate a layer of a field assist bonding material is applied. Preferably, the field assist bonding material layer has a thickness between about 50 nm and about 1,000 nm, more preferably, between about 150 nm and about 500 nm, such as about 150 nm to about 250 nm. The field assist bonding material can be a material capable of bonding glass substrates using the method described herein. Preferably, the field assist bonding material is silicon or silica. More preferably, the field assist bonding material is silicon.

The field assist bonding material can be applied to a plate, for instance, by chemical vapor deposition or by a sputtering process where surface molecules are emitted from a cathode when the cathode is bombarded with positive ions from a rare gas discharge and the surface molecules collide with and bond to a nearby substrate. Pursuant to the present invention, silicon layers of between about 150 nm and about 500 nm thickness have been bonded to glass plates under conditions that can be expected to generate an outer surface layer of silicon dioxide, such as an about 20 Å layer. The coated plate is treated, as needed, to create channels, reservoirs, or reaction cells using the method described below. Alternatively, the plate was so treated prior to coating with the field-assist bonding material. The coated plate is then positioned against another plate, which preferably is not coated, and placed in a field assisted bonding device 700 such as that illustrated in FIG. 8. The field assisted bonding device 700 has a heating device 710, such as a heating plate. The field assisted bonding device 700 further has an electrode 720 and a ground 730 that allows a voltage to be applied across the first plate 740 and the second plate 750, to which has been applied a layer of silicon 760. Arrows 770 indicate the electric field orientation. Generally, the field assisted bonding is conducted under a normal atmosphere.

The plates are brought to a temperature that is effective, when an appropriate electric field is applied across the plates, to accelerate the bonding process. While not wishing to be bound by theory, it is believed that the combination of a cathode applied to the first glass plate 740 and the greater exchange-site mobility of ions (such as sodium ions) caused by the elevated temperature causes an ion depletion on the face of the first glass plate 740 opposite that to which the cathode is applied. The ion depletion, it is believed, causes a surface charge at the bottom surface of first glass substrate 740, which correlates with the creation of a strong localized electrostatic attraction for the second substrate 750. It is clear that this process creates strong bonding between the substrates and, it is believed that this is due to the formation of chemical bonds between the silica of the first glass substrate 740 and the silicon coated onto the second glass substrate 750. Preferably, the temperature is brought to from about 200° C. to about 600° C., more preferably from about 300° C. to about 450° C. In a preferred embodiment, the temperature is at least about 50° C. less than the annealing temperature of the plates, such as from about 200° C. to about 150° C. less. During the process an voltage typically from about 200 V to about 2,500 V, preferably from about 500 V to about 1500 V, is applied across the first glass plate 740 and second glass plate 750. The voltage most suitably applied varies with the thickness of the glass plates. The voltage pulls the first glass plate 740 and second glass plate 750, including the silicon layer 760 applied to one of the plates, into intimate contact. Typically, hermetic sealing is achieved within minutes to about an hour, depending on the planar dimensions of the glass plates. The time required to achieve adequate sealing varies with, among other things, the smoothness of the plates, the electrical field strength, the temperature, and the dimensions of the plates. Bonding between the plates is typically apparent visually, since it is accompanied by the disappearance of the interface between the plates and the formation of gray color at the bonded regions that can be seen when an observer looks through the thinner dimensions of the two plates.

The method described above can be used to bond a glass substrate to another glass substrate and to a third glass substrate simultaneously. Those of ordinary skill will recognize that while a hot plate is illustrated as providing the heating for the thermal assisted bonding, other heating devices, including ovens, may be used. It will also be realized that it is desirable to match, when possible, the coefficients of thermal expansion of the substrates to be bonded.

The reservoirs, reaction cells, horizontal channels and other structures of the fluid distribution system can be made by the following procedure. A plate, that will for instance make up one of feedthrough plate 300, distribution plate 310, reaction cell plate 320 or intermediate plate 330, is coated sequentially on both sides with, first, a thin chromium layer of about 500 Å thickness and, second, a gold film about 2000 angstroms thick in known manner, as by evaporation or sputtering, to protect the plate from subsequent etchants. A two micron layer of a photoresist, such as Dynakem EPA of Hoechst-Celanese Corp., Bridgewater, N.J., is spun on and the photoresist is exposed, either using a mask or using square or rectangular images, suitably using the MRS 4500 panel stepper available from MRS Technology, Inc., Acton, Mass. After development to form openings in the resist layer, and baking the resist to remove the solvent, the gold layer in the openings is etched away using a standard etch of 4 grams of potassium iodide and 1 gram of iodine ($I_2$) in 25 ml of water. The underlying chromium layer is then separately etched using an acid chromium etch, such as KTI Chrome Etch of KTI Chemicals, Inc., Sunnyvale, Calif. The plate is then etched in an ultrasonic bath of HF—$HNO_3$—$H_2O$ in a ratio by volume of 14:20:66. The use of this etchant in an ultrasonic bath produces vertical sidewalls for the various structures. Etching is continued until the desired etch depth is obtained. Vertical channels are typically formed by laser ablation.

The preferred laser ablation technique uses an excimer laser micromachine station having an x-y manipulation table. For glass of 500 micrometers thick, reasonable laser parameters for ablating a round hole are 200 mJ at 200 Hz. In hard material such as glass, some microcracks may occur around the edge at the periphery of the entry and exit of the laser beam. At the entry, this damage is reduced by preparing the glass plate so that it has a 5 micrometer surface finish. This is usually done on surface lapping equipment. At the exit of the channel, the damage (called breakout) is controlled by preparing the glass plate, at the planned exit site, with a chemically etched pattern larger by about 25 micrometers, on all sides, than the cross-section of the channel at the point of exit. This acts as a guard for restraining the propagation of breakout.

The various horizontal channels of the distribution system embodiments typically have depths of about 50 microns to about 250 microns, preferably from about 50 microns to about 100 microns. The widths of the horizontal channels and the diameters of the vertical channels are typically from about 50 microns to about 300 microns, preferably about 250 microns.

F. Fabrication of Electrode-Based Pumps

In many embodiments, the liquid distribution systems of the invention require the formation of numerous electrodes for pumping fluids through the liquid distribution system. These electrodes are generally fabricated in the top glass plate of the liquid distribution system. Typically each pair of electrodes is closely spaced (e.g. 50 to 250 or 500 microns separation). The electrodes are fabricated with diameters of preferably about 25 microns to about 150 microns, more preferably about 50 microns to about 75 microns. In preferred embodiments, the liquid distribution system has 10,000 reaction cell 350 with each reaction cell 350 having 6–10 associated electrode-based pumps. Thus, a liquid distribution system can require about 200,000 to about 300,000 electrodes. To produce such structures using mass production techniques requires forming the electrodes in a parallel, rather than sequential fashion. A preferred method of forming the electrodes involves forming the holes 368 (not shown) in the plate (e.g., feedthrough plate 300) through which the electrodes 360 will protrude, filling the holes 368 with a metallic thick film ink (i.e., a so-called "via ink", which is a fluid material that sinters at a given temperature to form a mass that, upon cooling below the sintering temperature, is an electrically conductive solid) and then firing the plate and ink fill to convert the ink into a good conductor that also seals the holes 368 against fluid leakage. The method also creates portions of the electrodes that protrude through the plate to, on one side, provide the electrodes that will protrude into the liquids in fluid channels and, on the other side, provide contact points for attaching electrical controls.

For example, holes 368 are drilled in 500 micron thick plates of borosilicate glass using an excimer laser. Holes 368 having diameters between 50 and 150 microns are then filled with thick film inks, using an commercial Injection Via-fill Machine (Pacific Trinetics Model #VF-1000, San Marcos, Calif.). It has been discovered that only select formulations of via inks sufficiently function to fill such high aspect ratio holes 368 such that the fired ink adheres to the sides of the holes 368, does not crack during the firing process, and seals the holes 368 against fluid flow. One parameter that is important to so forming sealed, conductive conduits through high aspect holes 368 is selecting metal powder and glass powder components for the via ink that have sufficiently fine dimensions. One suitable formulation uses: 12-507 Au powder (Technic Inc., Woonsocket, R.I.), 89.3% w/w; F-92 glass (O. Hommel Co., Carnegie, Pa.), 5.7% w/w; 15% w/v ethyl cellulose N-300 (N-300, Aqualon, Wilmington, Del.) in Texanol™ (monoisobutarate ester of 2,2,4-trimethyl-1,3-pentandiol, Eastman Chemical Products, Kingsport, Tenn.), 2.4% w/w; 15% w/v Elvacite 2045™ (polyisobutyl methacrylate) in Terpineol T-318 (mixed tertiary terpene alcohols, Hercules Inc., Wilmington, Del.), 2.1% w/w; and Duomeen TDO™ (N-tallow alkyl trimethylenediamine oleates, Akzo Chemicals, Chicago, Ill.), 0.5% w/w. The gold powder from Technic, Inc. has an average particle diameter of 0.9 microns. Another suitable formulation uses: Ag Powder Q powder (Metz, South Plainfield, N.J.), 80.8% w/w; F-92 glass (O. Hommel Co. Carnegie, Pa.), 5.2% w/w; VC-1 resin (37% w/w Terpineol T-318, 55.5% w/w butyl carbitol, 7.5% w/w ethylcellulose N-300, Aqualon, Wilmington, Del.), 3.7% w/w; 15% w/v ethyl cellulose N-300 in Texanol™, 4.0% w/w; 15% w/v Elvacite 2045™ (polyisobutyl methacrylate) in Terpineol T-318, 4.1% w/w; Duomeen TDO™, 0.6% w/w; and Terpineol, 1.6% w/w. These formulations were fired at 550° C. to form high aspect ratio conductive conduits.

When the size of the glass or metal powders increases, good filling properties (lack of cracking, good sealing against liquids, good adherence to sides of hole) can often still be obtained by decreasing the amount of organic in the via ink.

The devices used to insert via inks into holes 368 in a plate typically include a metal stencil with openings corresponding to the openings in the plate. Via ink is applied above the stencil, which rests on the plate, and a bladder device is used to pressurize the ink to force it to fill the holes 368. After filling, the plate with its via ink-filled holes 368 is removed for further processing, as described below.

Prior to firing, much of the organic component is evaporated away by, for example, placing the ink-filled plate in a oven (e.g. at 100° C.) for about one to about thirty minutes. Preferably, the firing is conducted at a temperature from about 450° C. to about 700° C., such as a temperature from about 550° C. to about 600° C. However, the upper end of the appropriate firing temperature range is primarily dictated by the temperature at which the plate being treated would begin to warp. Accordingly, with some types of plates much higher temperatures could be contemplated.

To assure that there is conductive material that protrudes above and below the glass plate after firing, the top and bottom surface of the plate can be coated with a sacrificial layer of thicknesses equaling the length of the desired protrusions. The sacrificial layers can be applied before or after the holes 368 are formed in the plate. If before, then the holes 368 are formed through both the glass plate and the sacrificial layers. If after, then (a) corresponding openings through the sacrificial layers can be created by creating a gas pressure difference from one side of the plate to the other, which pressure difference blows clear the sacrificial material covering the holes 368 or (b) such openings through at least the top sacrificial layer are created when the pressure of the ink pushes through the sacrificial layer and into the holes 368 (leaving an innocuous amount of sacrificial layer material in the holes). An appropriate sacrificial layer burns away during the firing process. Sacrificial layers can be made coating a plate with, for instance, 5–25 w/w % mixtures of ethyl cellulose resin (e.g., Ethyl Cellulose N-300, Aqualon, Wilmington, Del.) dissolved in Terpineol T-318™ or Texanol™, or 5–50% w/w mixtures of Elvacite 2045™ in Terpineol T-318™. After firing, the surfaces of the electrode can be enhanced plating metals, such as nickel, silver, gold, platinum, rhodium, etc. The depositions can be performed using standard electrolytic and/or electroless plating baths and techniques.

Preferably, where a plate that is to contain etched openings will be processed to include electrodes, the etching occurs first, followed by coating with the sacrificial layer and forming the electrode holes.

In an alternate method of manufacture, for each pump, two or more metal wires, for example gold or platinum wires about 1–10 mils in diameter, are inserted into the openings in the channel walls about, e.g., 150 microns apart. The wires were sealed into the channels by means of a conventional gold or platinum via fill ink made of finely divided metal particles in a glass matrix. After applying the via fill ink about the base of the wire on the outside of the opening, the channel is heated to a temperature above the flow temperature of the via fill ink glass, providing an excellent seal between the wires and the channel. The via ink, which is used to seal the holes, can be substituted with, for instance, solder or an adhesive.

G. Capillary Barriers, including Reset Feature

Capillary barriers have been described above with reference to FIGS. 3. However, more complex design considerations than were discussed above can, in some cases, affect the design of the capillary barrier. In some cases it is desirable to narrow the sluice formed by second opening 362 or third opening 363 (not shown, described above) to increase the impedance to flow (i.e., the frictional resistance to flow) as appropriate to arrive at an appropriate flow rate when the associated first pump 360 or second pump 361 is activated. The problem that this design alteration can create is that narrower channels can increase capillary forces, thereby limiting the effectiveness of channel breaks.

Thus, in one preferred embodiment, a channel break further includes one or more upwardly oriented sharp edges 369 (not illustrated). More preferably, a channel break includes two or more upwardly oriented sharp edges 369.

In fabricating apparatuses with capillary barriers, care must be taken to assure the alignment of the various small-scaled features. Accordingly, an effort was undertaken to design a capillary barrier that was more forgiving of deviations in alignment. Such a design is reflected in FIG. 10A, which shows a liquid distribution having five plate layers, preferably formed of glass, comprising upper top layer 100A, and lower top layer 100B, upper center layer 110A, lower center layer 110B, and bottom layer 120. Between lower center layer 110B and bottom layer 120 is seal 101. Liquid flows from feeder channel 116, through alpha vertical channel 125, through distribution channel 122, to capillary break 170, which is formed by opening 164, which opens into cavity 162 formed in lower top plate 100B. When pump 160 is activated, liquid is pushed past the capillary break until it begins to fall into beta vertical channel 118 and thereafter into reaction cell 150. Reaction cell 150 has drain 155. It will be recognized from prior description that there can be several openings 164 forming several capillary breaks 170 that lead into beta vertical channel 118.

It has been found that the reproducibility of pumping can be improved by assuring that the capillary break occurs at the site intended. One way to do this is to "reset" the capillary break by injecting gas pressure from gas-source channel 102 to blow gas through beta vertical channel 118 and opening 162 to clear it of any liquid forming unwanted functional capillary breaks. Suitable gas inlets are shown, for example, in FIGS. 10B, 10C 10D and 10E. This gas pressure can back up the liquid in, for instance, the distribution channels 122, without detriment. However, the predominant pathway of gas flow is through the beta vertical channel 118, through reaction cell 150, and out drain 155.

Figure 10A:
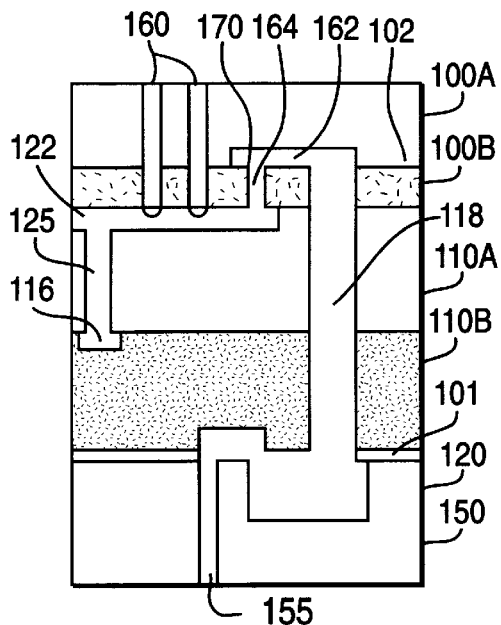
FIGS. 10A, 10B, 10C, 10D and 10E show a liquid distribution system with a modified capillary break and a gas-driven reset system.
Figure 10B:
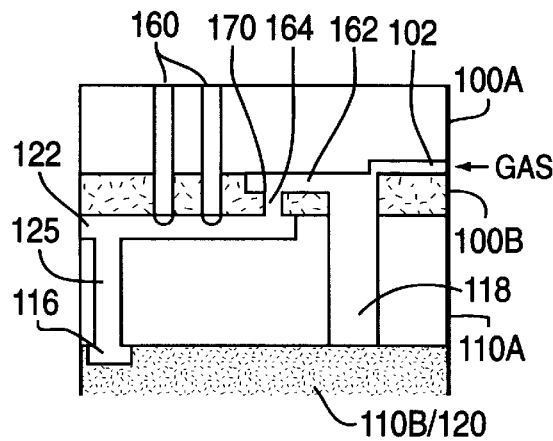
Figure 10C:
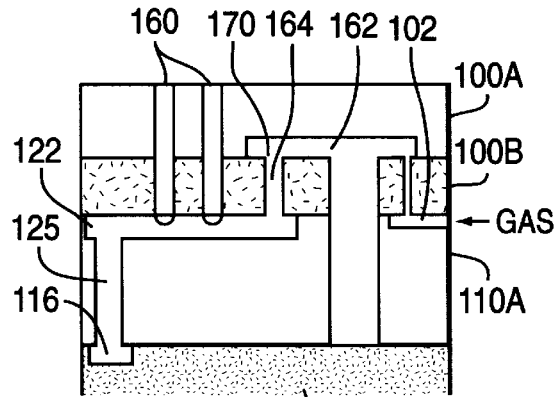
Figure 10E:
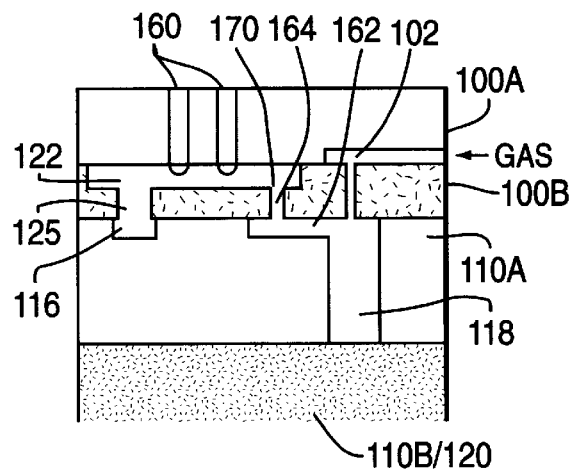
Figure 10D:
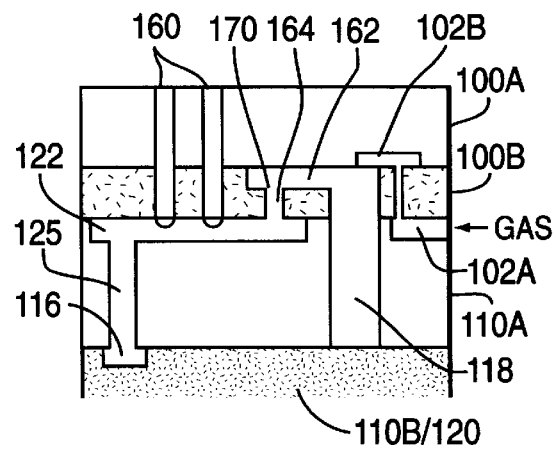

The construction of a liquid distribution system having the capillary breaks of this embodiment as shown in FIG. 10A is generally according to the methods described above, with some refinements pertaining to the upper top layer 100A and lower top layer 10B. For instance in FIG. 10B, the cavities 162 and opening 164 are formed in a plate of relatively larger thickness than the final lower top plate 100B, for instance a thickness of about 8 to about 20 mils. This plate is thinned to become the lower top plate 100B. A gas source channel 102 is formed in the upper top layer 100A. After the two plates 100A and 100B are joined in the manner described above, the combined thickness of the two plates is reduced by lapping. Finally, holes in which the electrodes of pumps 160 are formed are drilled through the joined combination of upper top plate 100A and lower top plate 100B. Other embodiments are shown in FIG. 10C, 10D and 10E. For the device in FIG. 10E the plates do not have to be pre-joined before drilling holes for electrodes if layer 100B is sufficiently thick to be self-supporting during the fabrication steps.

In one embodiment, channel system that distributes gas is designed as outlined below in Section J, for the secondary liquid distribution network. Such a design helps assure that the gas pressure reaching each cavity 162 is within the needed tolerance.

H. Secondary Liquid Distribution System

Practical experience with the electrode-based pumping systems described herein has established that electrode-based pumping, using an appropriately designed liquid distribution system, is much more broadly applicable to a variety of liquids than was previously appreciated. Nonetheless, a number of fluids are not pumped with as much efficiency as could be desired. For instance, in synthesizing polypeptides, it has been found that the reactants that are favorably varied between reaction chambers to create a combinatorial library of products are generally readily pumpable, either directly or through the use of pumping additives. These chemicals have been termed "diversity" chemicals. Examples of classes of such generally pumpable diversity chemicals include substituted amines, carboxylic acids and esters. A number of liquids do not need to be selectively channeled to one reaction cell versus another, but are instead generally concurrently pumped to all of the reaction cells. These liquids are "non-diversity" liquids. Such non-diversity liquids include, for example, organic wash solvents such as, for example, dimethylformamide ("DMF"), tetrahydrofuran ("THF"), dimethylsulfoxide ("DMSO"), acetone, methylalcohol, N-methylpyrrolidinone ("NMP"), methylene chloride and chloroform. Such non-diversity liquids further include deprotection reagents that are effective to remove a protecting group utilized in a particular synthetic chemistry such as, for example 20% piperidine in DMF, 4-benzylpiperidine in THF and trifluoroacetic acid. As it happens, a number of these non-diversity liquids are particularly difficult to pump electrokinetically. Most particularly, it is the liquids with relatively higher conductivities that present the greatest challenge. However, since these non-diversity liquids do not require selective, generally processor-controlled, distribution, they can be distributed non-selectively using a secondary distribution system, which secondary system can be much simpler than the primary system described above.

Figure 11A:
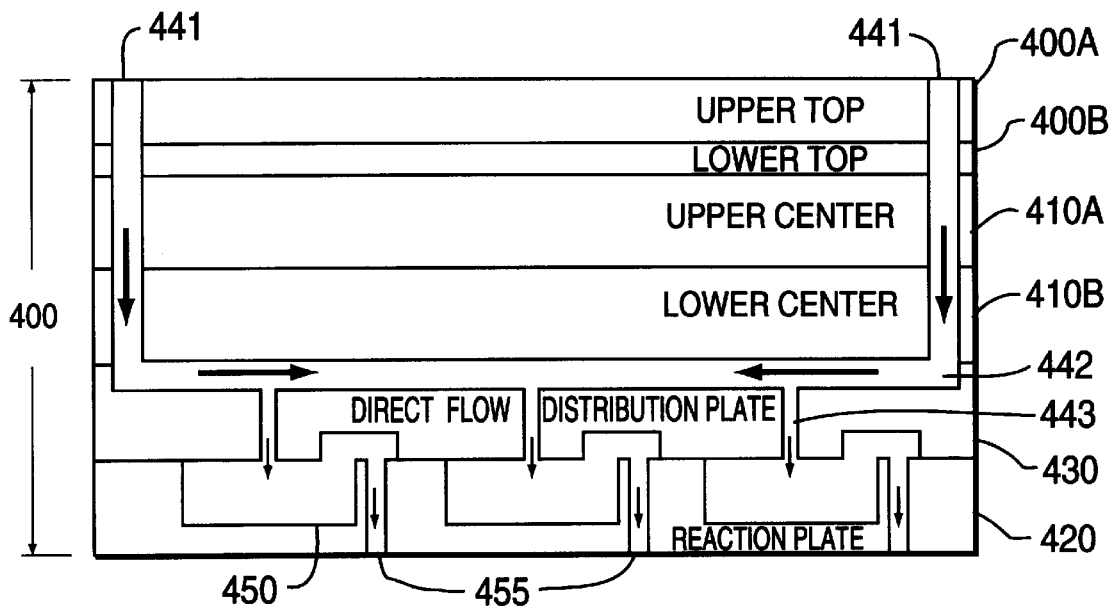
FIGS. 11A, 11B and 11C show a secondary fluid distribution network for non-selectively distributing a fluid to the reaction cells of a liquid distribution system.

One secondary liquid distribution system 400 for accomplishing this is illustrated in FIG. 11A, which illustrates a secondary liquid distribution system 400 formed of an upper top layer 400A, a lower top layer 400B, an upper center layer 410A, a lower center layer 410B, a secondary distribution layer 430, and a bottom layer 420. Upper top layer 400A, lower top layer 400C, upper center layer 410B and lower center layer 410B provide the channels and pumps for selectively distributing liquid to reaction cells 450 using, for example, the arrangement of channels and pumps described above. Not shown are beta vertical channels 418 that connect the selectable liquid distribution network to the reaction cells 450. One or more inlets 441 operate to pressurize a network of channels 442 formed in secondary distribution layer 430. Outlets 443 from channels 442 feed the fluid from channels 442 into reaction cells 450.

Figure 11B:
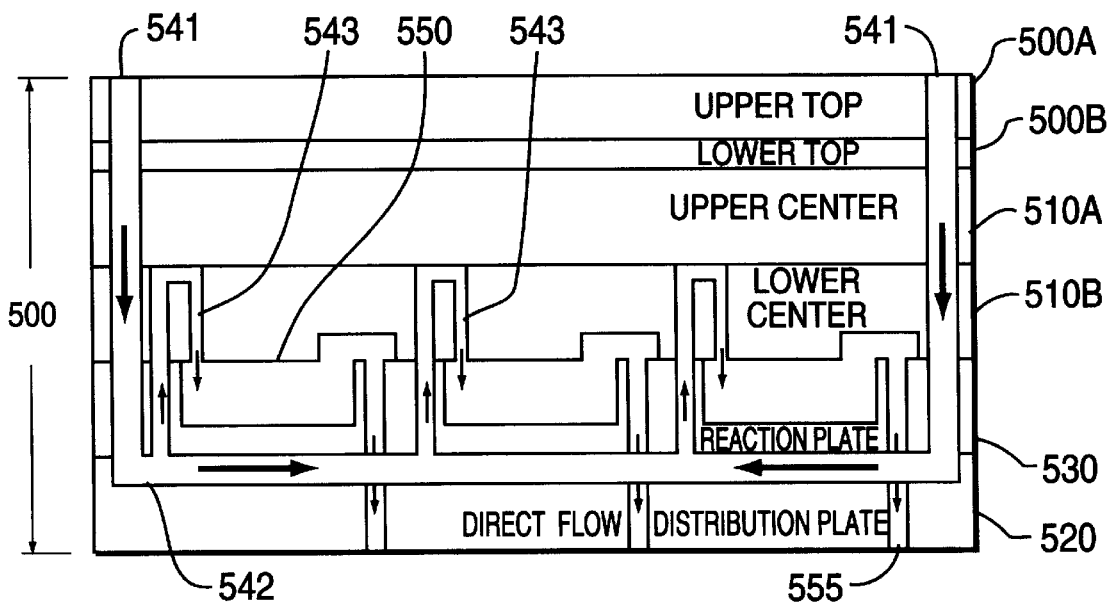

Another secondary liquid distribution system 500 for accomplishing this is illustrated in FIG. 11B. which illustrates a secondary liquid distribution system 500 formed of an upper top layer 500A, a lower top layer 500B, an upper center layer 510A, a lower center layer 510B, a reaction cell layer 520, and a secondary distribution layer 430. Upper top layer 500A, lower top layer 500B, upper center layer 510A and lower center layer 510B provide the channels and pumps for selectively distributing liquid to reaction cells 550 using, for example, the arrangement of channels and pumps described above. Not shown are beta vertical channels 518 that connect the selectable liquid distribution network to the reaction cells 550. One or more inlets 541 operate to pressurize a network of channels 542 formed in secondary distribution layer 530. Outlets 543 from channels 542 feed the fluid from channels 542 into reaction cells 550. The restraints of representing a three-dimensional device in two dimensions leads to the suggestion in FIG. 11B that channels 542 and drains 555 intersect, while, in fact, these structures are formed at differing depths within the device to avoid such overlap.

Figure 11C:
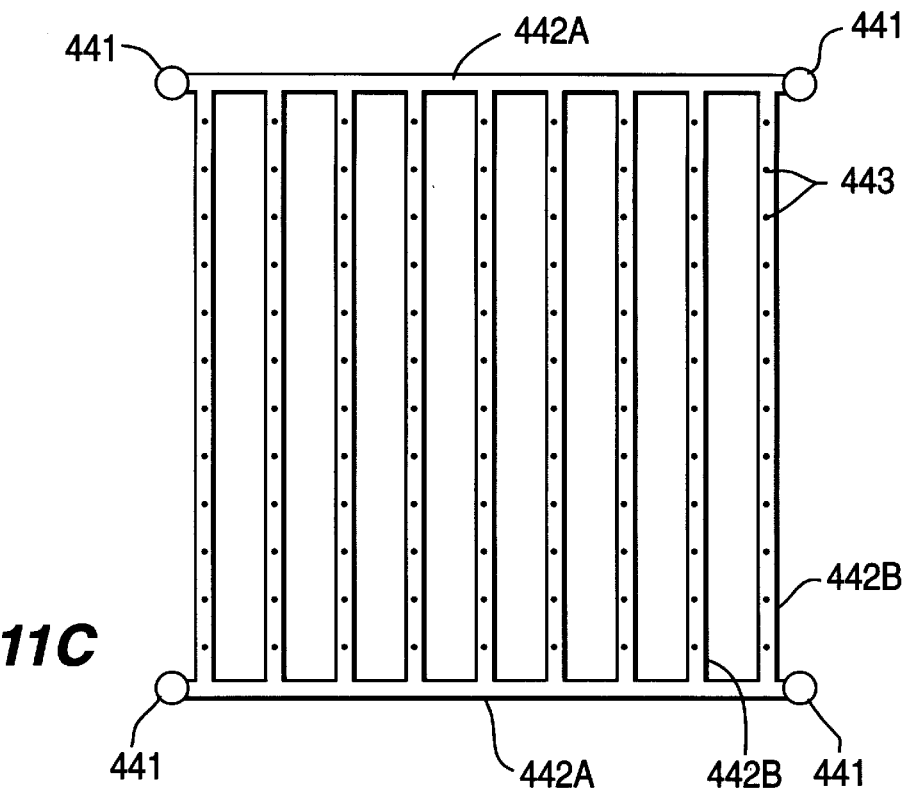

FIG. 11C illustrates how the channels 442 can be arranged in the horizontal plane. Inlets 441 (which are only shown at the point of intersection with the plane illustrated) connect to first channels 442A, which branch to connect with multiple second channels 442B. Second channels 442B connect with multiple outlets 443, which each lead to a reaction cell 450.

The amount of fluid that flows through each outlet 543 or outlet 443 is dependent on such properties as the viscosity of the fluid and the diameters of the various fluid conduits. Preferably, no outlet 443 or outlet 543 has less than about 20%, more preferably less than about 40%, still more preferably less than about 60%, of the fluid flow observed at any other outlet 443 or outlet 543. Preferably, the second channels 442A have a cross-section between about 300×130 microns and about 150×75 microns, more preferably about 200×100 microns, and the outlets 443 have a diameter between about 50 microns and about 150 microns, more preferably about 100 microns. In an alternative embodiment, the outlets 443 have a diameter that progressively gets larger as the distance from the closest first channel 442A increases. For instance, where at an outlet closest to an intersection with a first channel 442A the outlet 443 diameter is between about 50 microns and about 100 microns, the diameter increases to, for example, about 300% of the initial value. In another alternative embodiment, the cross-section of the second channels 442B decreases as the distance from the closest first channel 442A increases. For instance, where at an intersection with a first channel 442A the second channel 442B cross-section is between about 200 microns and about 350 microns, the cross-section decreases to between about 50% and about 25% of the initial value. These variations in diameter and cross-section help render more constant the amount of flow occurring at each outlet 443. Additionally, in this same way, the diameter of the first channels 442 can be decreased as the distance from the closest inlet 441 increases. It will be recognized that where the properties of the fluids to be non-selectively distributed are defined, channel geometries can be adjusted according to known fluid dynamics principles to increase the variability in fluid flow at each outlet 443. Other methods such as local cross-sectional restrictions in channels 442A and 442B can also be used to balance the pressure of the system.

A liquid distribution system that incorporates both a system that selectably routes liquids and one that non-selectively routes liquids can be described as comprising (a) two or more reaction cells including a first reaction cell and a second reaction cell, (b) two or more selectable liquid sources including a first selectable liquid source and a second selectable liquid source, (c) a selectable liquid distribution network operating under the control of pumps that can selectably pump (1) liquid from the first selectable liquid source to either the first reaction cell or the second reaction cell, or both or (2) liquid from the second selectable liquid source to either the first reaction cell or the second reaction cell, or both, (d) a non-selectable fluid source, and (e) a non-selectable liquid distribution network that moves fluid from the non-selectable fluid source into both the first reaction cell and the second reaction cell. Preferably, the non-selectable liquid distribution network comprises at least one of (i) a pump that operates to pressurize the fluid from the non-selectable fluid source or (ii) a source of gas pressure that can be connected to the non-selectable fluid source to pressurize the fluid from the non-selectable fluid source. Preferably, such a distribution system comprises at least about 100 reaction cells and the non-selectable system operates such that none of the reaction cells receives through the system less than about 20% of the amount of non-selectable fluid flow received by any other reaction cell.

Figure 14:
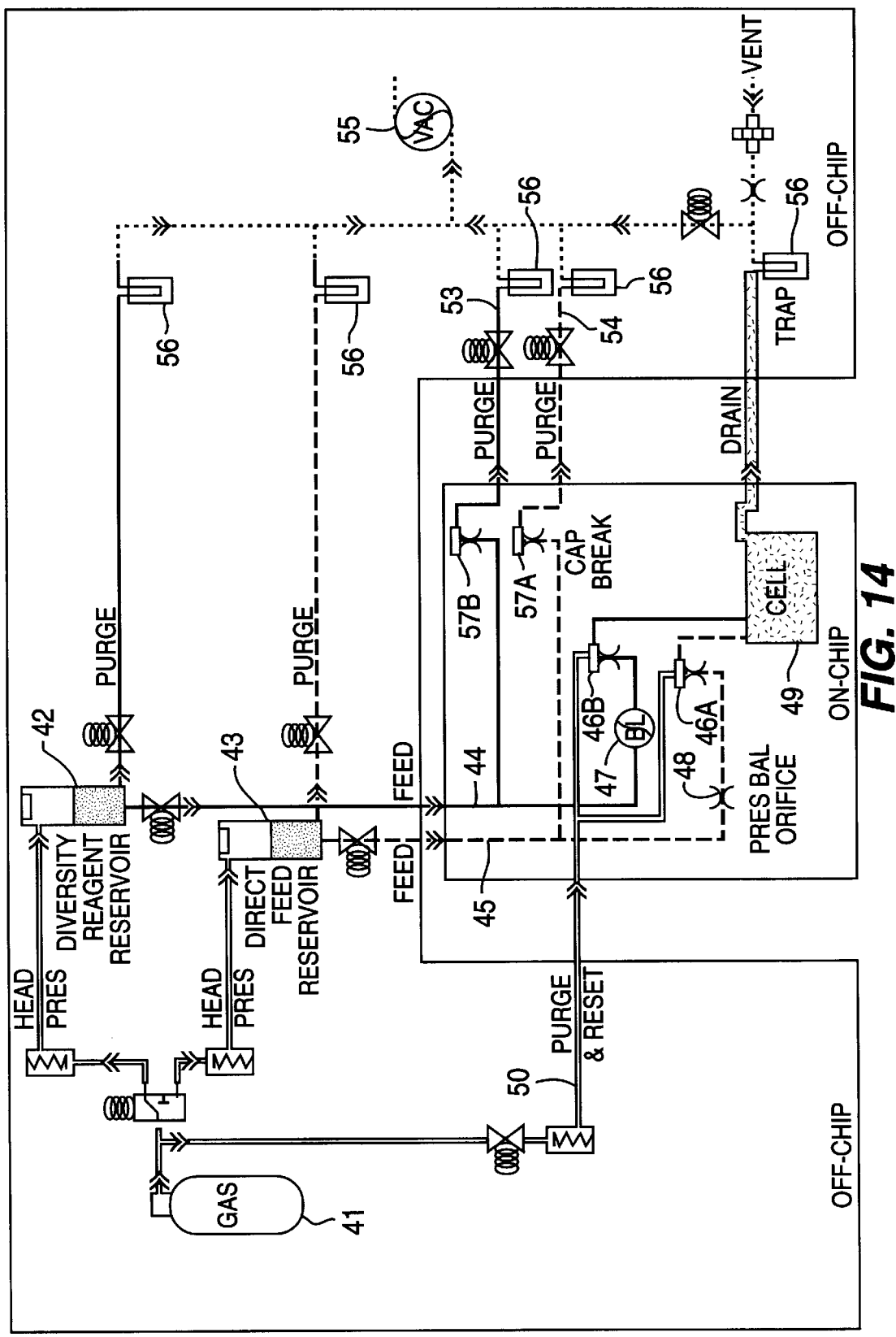
FIG. 14 illustrates another provision for directing nondiversity fluids into reaction cells.

The non-diversity fluids can also be distributed by using the previously described matrix channels with the electrokinetic pumps omitted or with the electrokinetic pumps turned off. The fluids would be controlled by the same capillary barrier approach. FIG. 14 describes this system in a schematic that has been simplified to represent only one reaction cell. The diversity reagents and the non-diversity reagents have separate reservoirs, 42 and 43, respectively (which reservoirs can be reagent cartridges). A gas source 41 applies a controllable head pressure on each source. This head pressure can be computer adjusted to the conditions of the experiment. For instance, the head pressure can be optimized to the fluid characteristics of the reagent and/or the ratio of the number of pumps that are on/off. The non-diversity reagent is pressurized to flow through the non-diversity channel 45 through pressure balancing restriction 48, which restriction is typically a point at which the channel 45 narrows, until arrested by the capillary barrier 46A. When the external head pressure is increased, the reagent will overcome the capillary barrier and flow in the cell 49. The diversity reagent similarly is pressurized to flow through diversity channel 44 to the capillary barrier 46B. The increased pressure to overcome the capillary barrier is produced internally from the electrokinetic pumps 47 thus allowing the diversity reagents to be selectively directed into cells by selectively operating a subset of electrokinetic pumps 47. The pressurized gas is also a source of gas for resetting the capillary barriers through purge channels 50, as described above.

Continuing to refer to the schematic of FIG. 14, a lower than atmosphere pressure such as that created by a vacuum pump can be used for purging the system when an exchange of fluid in the various channels is required. In this embodiment, vacuum pump 55 provides suction to remove fluid from reagent reservoirs 42 or reagent reservoirs 43. This system is also used to remove unwanted reagent or solvent from the diversity channels 44 and nondiversity channels 45, for instance via purge channels 53 and 54. Unwanted flow in purge channels 54 and 53 can be controlled by capillary barriers 57A and 57B, respectively. Traps 56 can be used to collect the fluids that have been purged. This system can also be used to control and remove the effluent from the wells during the synthesis process. FIG. 14 further illustrates off/on valves, switching valves and pressure regulators, using recognized symbols for these elements.

I. Pressure Enhancement of Electrokinetic Pumping

Figure 12:
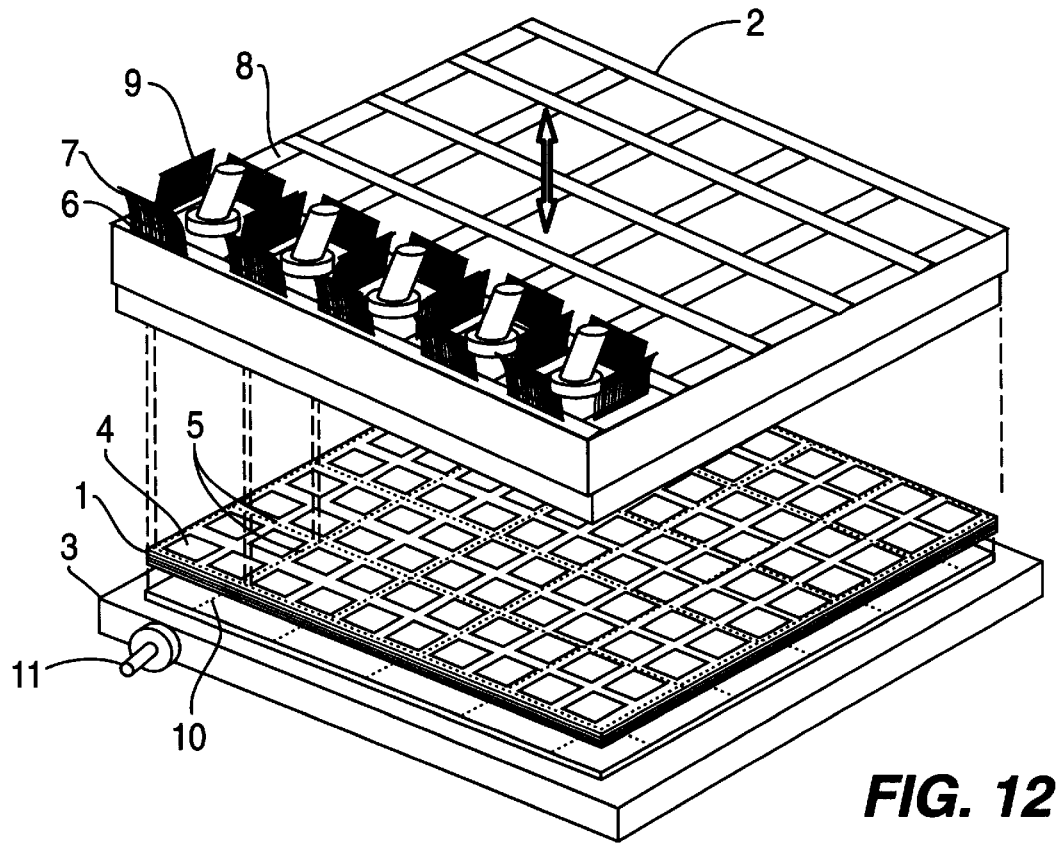
FIG. 12 illustrates how the external connections of a liquid distribution system can be arranged.

Illustrated in FIG. 12 is an embodiment showing the interface services to the liquid distribution system. The connection for fluids and electronics is provided by a service head 2 which can translate vertically to contact the liquid distribution system 1. The connection for effluent control and vacuum purging is provided by the workstation base 3. In this configuration, the liquid distribution system 1 consists of a very high number of reaction cells such as 1,000 to 10,000. For 10,000 cells, the layout is portioned into one hundred 100 cell arrays 4. By electronic control, these arrays may be made to perform independently as a 100 cell system or as an integrated 10,000 cell system or other convenient combinations. A small space surrounding the 100 cell arrays is used to introduce fluids and gas from the top and purge fluids from the bottom. The external introduction of fluids and gas to 100 cell subsets provides a means of restoring fluid pressure which will have been reduced due to fluid friction in the distribution channels. On the top side, since fluids and gas need only be introduced to each array from two edges to meet the needs of both the diversity and non-diversity operation, the pattern of inlet holes 5 on the structure encircles a four-array coupon in the interspace. Since flow in the array is from the inlet side of the array toward the opposite side, purging is performed form the opposite side and, for convenience, from the bottom. This dictates that the outlet holes (as shown by the mating vacuum holes 10 in the base 3) for purging also border two sides of each array but in this case are laid out in the shape of a cross.

The service head 2 in this configuration consists of fluid feed modules 6 and electronic contact modules 8. The fluid feed modules are used to interface the fluid supply reservoirs or reagent cartridges (not shown) to the liquid distribution system 1 by means of fluid tubing 7. There consists of one row diversity and non-diversity feed module and one column/matrix diversity and non-diversity feed module for each four-array coupon. Each electrical contact module 8 is the electrical interface between the distribution system 1 and wires 9 to the control electronics (not shown). It consists of an assembly of compliant conductors, as may be procured customized to need for instance from CK Technologies, Inc., Newbury Park, Calif., that make contact to a conductive pattern (not shown) on the top surface of the distribution system 1. Each contact module 8 makes contact to each electrode through the conductive pattern when the service head 2 is lowered vertically. The conductive pattern is, for example, of a hard gold that has been applied to the glass top surface of the distribution system 1 by standard photolithographic techniques. Each contact module 8, services a four-array coupon.

Figure 13:
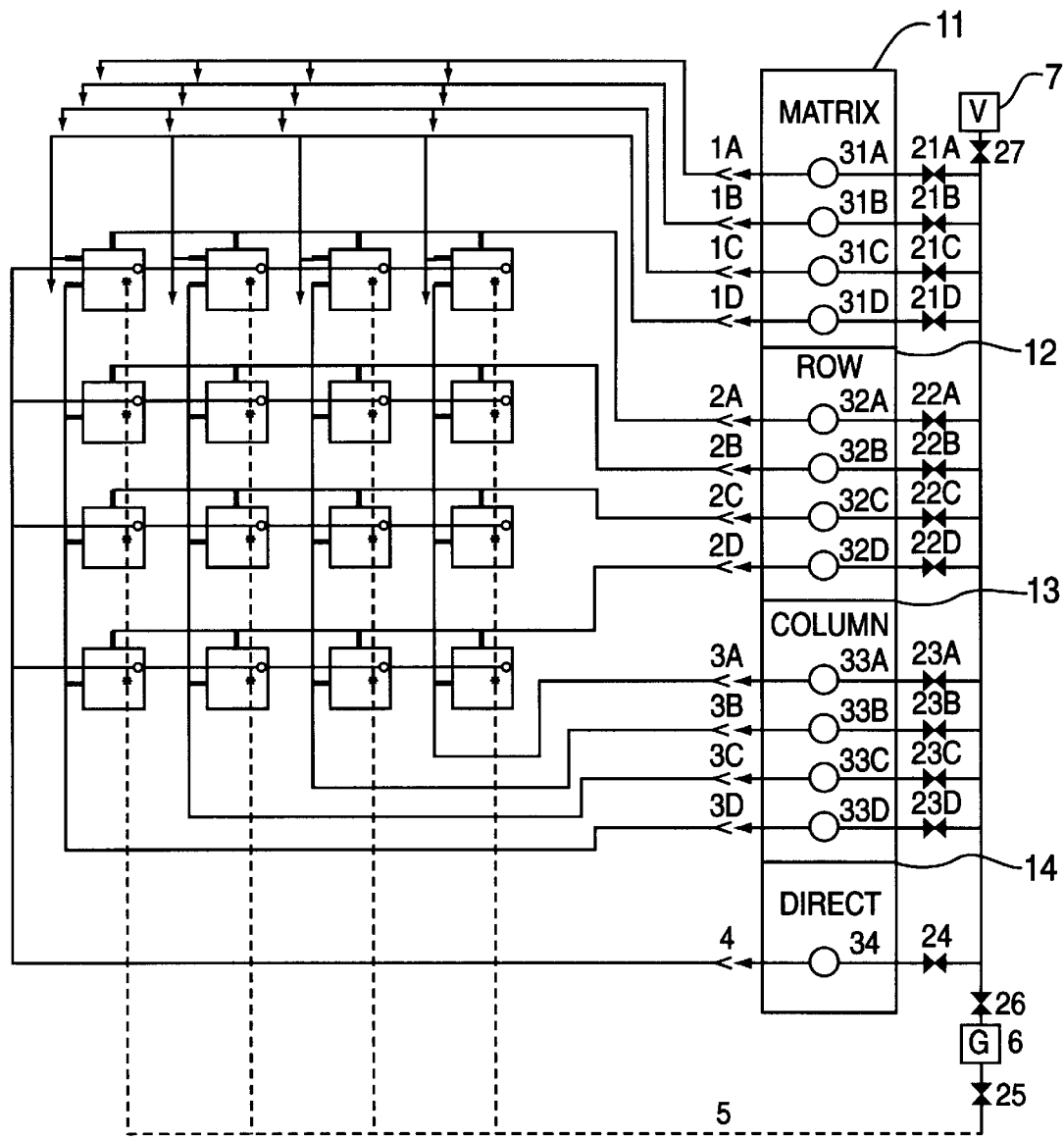
FIG. 13 shows the use of replaceable cartridges to provide reagent liquids, and gas and vacuum sources for facilitating the operation of a liquid distribution system.

The workstation base 3 which supports and locates the liquid distribution system 1, also serves as the vacuum interface to the bottom of the liquid distribution system 1 for purging and effluent control. An external vacuum source is applied through vacuum fitting 11. FIG. 13 schematically illustrates the functions shown in FIG. 14, described above, for multiple cells. FIG. 13 illustrates that these liquid and fluid sources can be connected to cartridges containing reagent liquids. Illustrated are first cartridge 11 connected to the four first liquid sources 1, second cartridge 12 connected to the four second liquid sources 2, third cartridge 13 connected to the four third liquid sources 3, and fourth cartridge 14 connected to fluid source 4. Reset gas pressure source 5 carries gas to gas-source channels 102, as described above. First cartridge 11 includes alpha first container 31A connected to alpha first liquid source 1A, beta first container 31B connected to beta first liquid source 1B, gamma first container 31C connected to gamma first liquid source 1C, and delta first container 31D connected to delta first liquid source 1D. Second cartridge 12, third cartridge 13 and fourth cartridge 14 similarly include individually identified containers, as indicated in the drawing. The fluid containers of each cartridge and reset gas source 5 are connected through first valves 21, second valves 22, third valves 23 fourth valves 24, fifth valves 25, sixth valves 26 and seventh valve 27 to (a) a gas reservoir 6 that preferably contains an inert gas such as nitrogen, helium or argon and (b) a reduced pressure source 7. It will be recognized that there can be as many cartridges as there are liquid or fluid sources. The cartridges can be coded, for instance with a bar code, with information relating to the electrokinetic pumping characteristics of the liquids packaged within them. The cartridges are preferably replaceable and detachable.

In this embodiment the pressure of the liquid feed into the liquid distribution device is kept relatively constant by using gas reservoir 6 to apply a blanket of gas pressure over the liquid in the cartridges. The pressure of this gas can be regulated by known means, such as the means used for natural gas regulation. The liquids are advantageously inserted into the liquid distribution device with a pressure head to help reproducible advance past the capillary breaks with the aid of the micropumps. Preferably, the liquid source can be pressured to achieve a hydrostatic head of from about 0 to about 3 inches, more preferably from about 0 to about 2 inches, yet more preferably from about 0 to about 1 inch.

The reduced pressure source 7 can be, for example, a vacuum pump. Precautions to avoid contaminating the pump with reagents and to avoid contaminating the liquid distribution system with pump oil should be employed. The reduced pressure is used to withdraw reagent from the liquid distribution system, including from the channels of the primary distribution network into which it has flowed.

Other features of liquid distribution systems are described in: (1) U.S. application Ser. No. 08/556,036, filed Nov. 9, 1995, Docket No. 11402G, entitled, "Liquid Distribution System"; (2) U.S. application Ser. No. 08/338,703, filed Nov. 10, 1994, Docket No. 11402, titled "A Partitioned Microelectronic and Fluidic Device Array for Clinical Diagnostics and Chemical Synthesis"; (3) U.S. application Ser. No. 08/469,238, filed Jun. 6, 1995, Docket No. 11717, titled "Apparatus and Methods for Controlling Fluid Flow in Microchannels"; (4) U.S. application Ser. No. 08/483,331, filed Jun. 7, 1995, Docket No. 11740, titled "Method and System for Inhibiting Cross-Contamination in Fluids of Combinatorial Chemistry Device"; (5) U.S. application Ser. No. 08/556,423, filed No. 9, 1995, Docket No. 11717A, titled "Electrokinetic Pumping"; (6) U.S. application Ser. No. 08/554,887, filed Nov. 9, 1995, Docket No. DSRC 11948, titled "Method Of Producing Micro-Electrical Conduits"; (7) U.S. application Ser. No. 08/630,018, filed Apr. 9, 1996, Docket No. DSRC 12098, titled Plate For Reaction System and (8) U.S. application Ser. No. 08\730,636, Docket No. DSRC 12385 (filed as DSRC 11402H), titled "Liquid Distribution System", filed Oct. 11, 1996. The disclosure of the Nov. 9, 1995 application entitled "Liquid Distribution System" and of all the applications identified in this paragraph are incorporated herein by reference in their entirety.

EXAMPLES

Example 1

Liquids Pumped with a Simple Electrode-Based Pump

Using the 1 mm capillary with a two electrode-pump described above in Section B.ii., a number liquids have been tested, including the following solvents:

| Solvent | Flow direction | voltage applied |
| --- | --- | --- |
| N-methyl-pyrrolidinone (NMP) | + | 1470 |
| Dimethyl formamide (DMF) | + | 390 |
| Dichloromethane (DCM) | − | 686 |
| Methanol (MeOH) | − | 489 |
| Isopropanol (IPA) | + | |
| Acetone | + | |
| Acetonitrile | + | |

The following solutions in NMP, at 0.1M unless otherwise indicated, have been tested:

| Reagent | Flow direction |
| --- | --- |
| trans-4-(trifluoromethyl)-cinnamic acid | − |
| 5-benzimidazolecarboxylic acid | − |
| N,N-dicyclohexylcarbodiimide | + |
| isobutylamine | + |
| 2-(1H-benzotriazole-1-yl)-1,1,3,3-tetramethyluronium hexafluorophosphate (HBTU) | No flow at 0.1M, flow occurs at lower concentrations (0.01–0.1M) |

The following solutions in DMF, all at 0.1M excepting piperidine, which was 20% v/v, have been tested:

| Reagent | Flow direction* |
|---|---|
| p-carboxybenzenesulfonamide | −P |
| 4-fluorophenylacetic acid | −P |
| 4-methoxyphenylacetic acid | −P |
| m-trifluoromethylbenzoic acid | −P |
| 3-(4-methoxyphenyl)propionic acid | − |
| 4-bromocinnamic acid | −P |
| terephthalic acid | −P |
| isophthalic acid | −P |
| 1,3-phenylenediacetic acid | −P |
| 1,4-phenylenediacetic acid | −P |
| 3-(4-carboxyphenyl) propionic acid | −P |
| 1,4-phenylenedipropionic acid | −P |
| 4,4'-oxybis (benzoic acid) | −P |
| 4,4'-dicarboxybenzophenone | −P |
| piperidine | + |
| 1,3-diisopropylcarbodiimide | + |
| allylamine | + |
| butylamine | + |
| isoamylamine | + |
| propylamine | + |
| isobutylamine | + |
| cyclohexylamine | + |
| heptylamine | + |
| benzylamine | + |
| phenylamine | +P |
| 3-amino-1-propanol | +P |
| 2-aminoethanol | + |
| 4-(aminomethyl) pyridine | +P |
| 4-(2-aminoethyl) morpholine | +P |
| 1-(3-aminopropyl) imidazole | + |
| triphenylphosphine | + |
| 4-(aminopropyl) morpholine | + |
| 9-fluorenemethanol | + |
| p-nitrobenzyl alcohol | + |
| p-(methylthio) benzyl alcohol | − |
| o-aminobenzyl alcohol | + |
| 2-methoxybenzyl alcohol | + |
| 2-(triflouromethyl) benzyl alcohol | + |
| 2-amino-3-phenyl-1-propanol | +P |
| diethylazodicarboxylate | −P |
| 4-dimethylaminopyridine | +P |
| carbazole | + |
| azobenzene | + |
| 3,4-dihydroxybenzoic acid | −P |
| 4-methylmorpholine N-oxide | + |
| 3-cyanobenzoic acid | No flow |
| 4-nitrophenylacetic acid | No flow, at 0.1M, flow occurs at lower concentrations (0.01–0.1M) |
| 2-(1H-benzotriazole-1-yl)-1,1,3,3-tetramethyluronium hexafluorophosphate (HBTU) | No flow, at 0.1M, flow occurs at lower concentrations (0.01–0.1M) |
| 2,3-dichloro-5,6-dicyano-1,4-benzoquinone | + weak |
| tetrapropylammonium perruthenate | No flow |
| 1-oxo-2,2,6,6-tetramethylpiperdinium chloride | No flow |
| 5-benzimidazolecarboxylic acid | N.D.[b] |
| 4-(aminomethyl) benzoic acid | N.D. |
| 4-(aminomethyl) benzoic acid | N.D. |
| N,N-diisopropylethylamine | N.D. |
| isobuylamine | N.D. |
| glutathione (SH) | N.D. |

Figure 8:
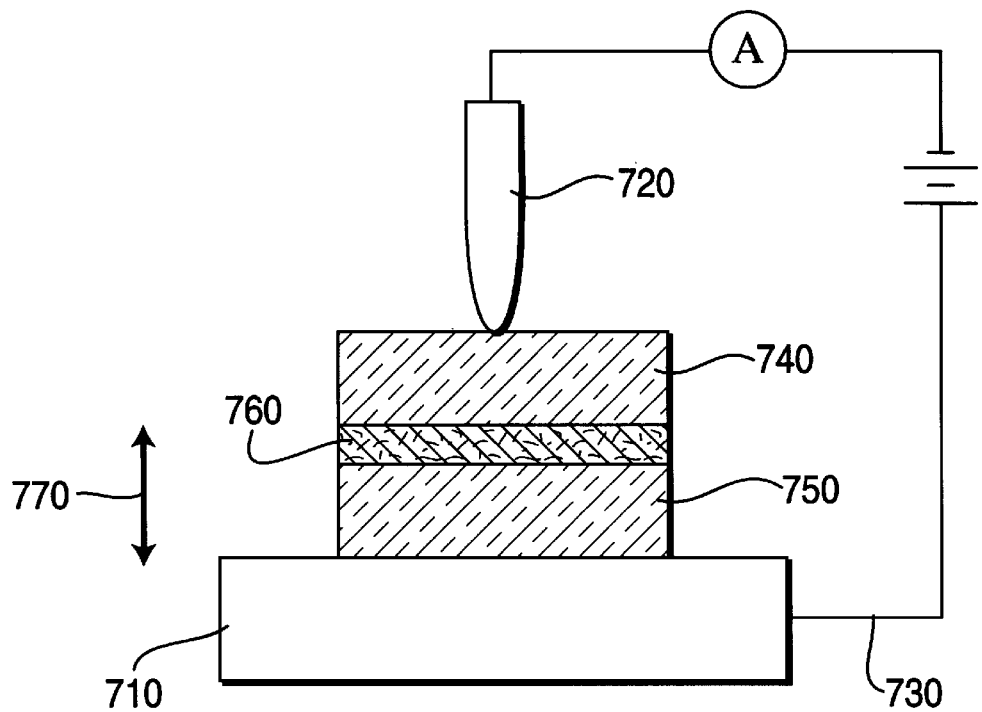
FIG. 8 shows a device for conducting field assisted bonding of plates.

*Those directional indicators ("+" or "−") followed by a "P" indicate that flow was achieved using a pulsed voltage program pursuant to FIG. 8, where $\tau_1$ = 0.1–1 ms and $\tau_2$ = 3.0–10 ms.

[b]"N.D.", in this table and the tables below, indicates either that the solute was immiscible with the solvent or that visual inspection suggested that it had decomposed.

The following solutions in DCM, at 0.1M unless otherwise indicated, have been tested:

| Reagent | Flow direction* |
|---|---|
| allylamine | − |
| butylamine | − |
| cyclohexylamine | − |
| 1-(3-aminopropyl) imidazole | − |
| diethylazodiacarboxylate | − |
| triphenyl phosphine palladium(o) | − |
| isobutylamine | − |
| isoamylamine | − |
| propylamine | − |
| 1-(3-aminopropyl)imidazole | − |
| p-carboxybenzenesulfonamide | N.D. |
| 2-(1H-benzotriazole-1-yl)-1,1,3,3-tetramethyluronium hexafluorophosphate (HBTU) | N.D. |

*Those directional indicators ("+" or "−") followed by a "P" indicate that flow was achieved using a pulsed voltage program pursuant to FIG. 8, where $\tau_1$ = 0.1–1 ms and $\tau_2$ = 3.0–10 ms.

The following solutions in methanol, all at 0.1M, have been tested:

| Reagent | Flow direction* |
|---|---|
| 4-fluorophenylacetic acid | − |
| 9-fluorenemethanol | −P |
| p-(methylthio) benzyl alcohol | − |
| (R) sec-phenethyl alcohol | − |
| 3-cyanobenzoic acid | No flow |
| 4-nitrophenylacetic acid | − weak |
| allylamine | No flow |
| 2-aminoethanol | No flow |
| 2-(1H-benzotriazole-1-yl)-1,1,3,3-tetramethyluronium hexafluorophosphate (HBTU) | N.D. |
| isobutylamine | N.D. |
| isomylamine | N.D. |

*Those directional indicators ("+" or "−") followed by a "P" indicate that flow was achieved using a pulsed voltage program pursuant to FIG. 8, where $\tau_1$ = 0.1–1 ms and $\tau_2$ = 3.0–10 ms.

Example 2
Electrode-Based Pumping Past Capillary Barriers

Figure 9:
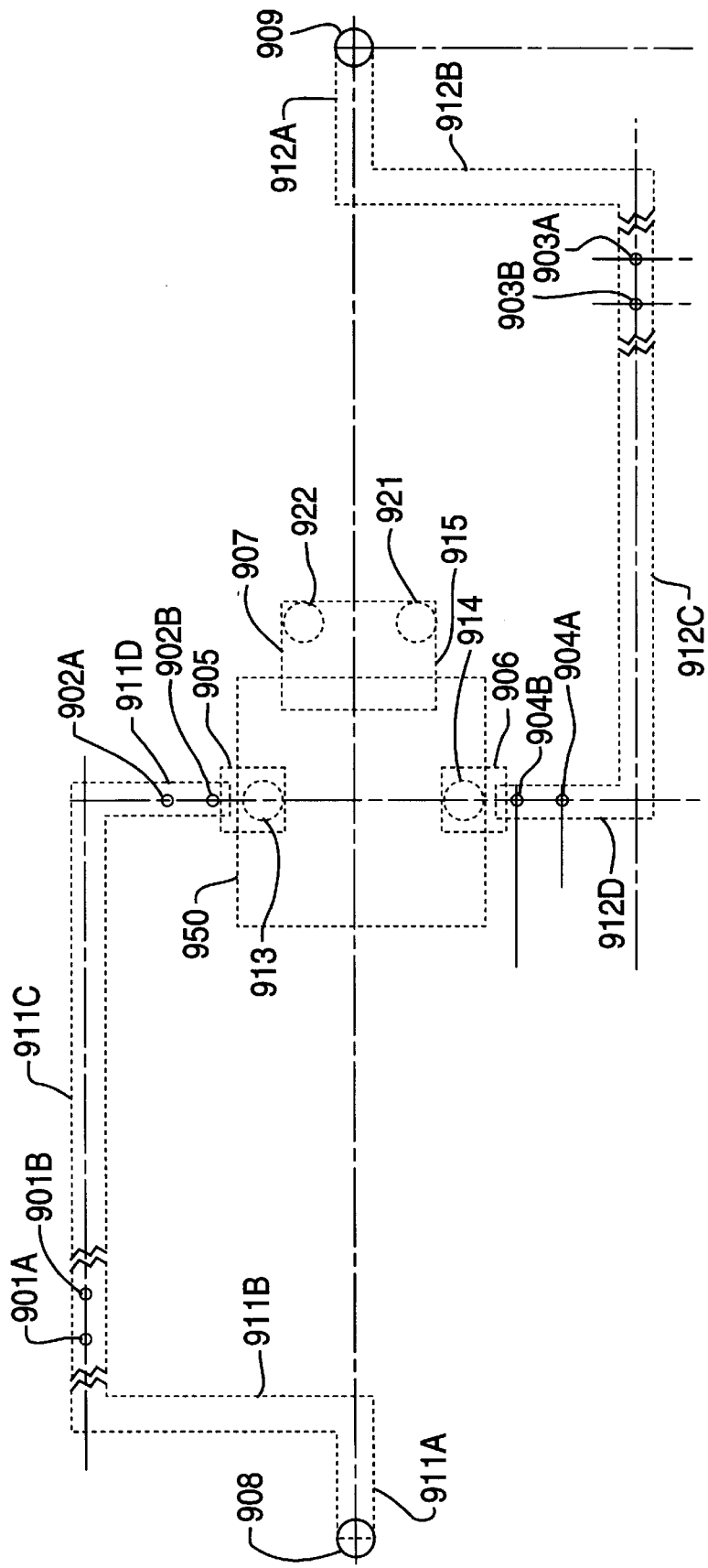
FIG. 9 shows a liquid distribution system design pursuant to the hydrologic liquid distribution system.

FIG. 9 shows a prototype liquid distribution system fabricated pursuant to the hydrologic liquid distribution system. The distribution system was constructed from three plates of Corning 7740 glass, Corning Glass, Inc., Corning, N.Y. which plates became top plate 910, intermediate plate 920 and bottom plate 930. The top of intermediate plate 920 was coated with silicon as described above. In top plate 910 were formed, by laser drilling, first hole 901A, second hole 901B, third hole 902A, fourth hole 902B, fifth hole 903A, sixth hole 903B, seventh hole 904A and eighth hole 904B, which holes each had a diameter of 75 μm. First and second holes 901A and 901B were used to form first model electrode-based pump 961. Third and fourth holes 902A and 902B were used to form second prototype electrode-based pump 962. Fifth and sixth holes 903A and 903B were used to form third prototype electrode-based pump 963. Seventh and eighth holes 904A and 904B were used to form fourth model prototype electrode-based pump 964. The electrodes in each of first through fourth prototype electrode-based pumps, 961–964, were separated by 200 μm. By etching, alpha opening 905, beta opening 906 and gamma opening 907 were formed on the underside of top plate 910. By laser drilling, ninth hole 908 and tenth hole 909, each with a diameter of 150 μm, were formed through upper plate 910.

In intermediate plate 920 were formed first prototype channel 911 (made up of segments 911A–911D) and second prototype channel 912 (made up of segments 912A–912D). First and second prototype channels 911 and 912 having a depth of 80 μm and a width of 150 μm. The entries into these two prototype channels 911 and 912 are provided by ninth hole 908 and tenth hole 909, respectively. First reaction cell access hole 913 and second reaction cell access hole 914, each with a diameter of 150 μm, were laser drilled through the intermediate plate 920. In the underside of intermediate plate 920, a delta opening 915 was formed, which delta opening 915 connects the reaction cell 950 to first and second prototype drain holes 921 and 922.

In the bottom plate 930, the reaction cell 950 was formed by etching. First prototype drain hole 921 and second prototype drain hole 922 were laser drilled through bottom plate 920. The top plate 910 and intermediate plate 920 were bonded together by field assisted thermal bonding.

When methanol was introduced into first prototype channel 911, the liquid was stopped from flowing into reaction cell access hole 913 by the capillary barrier formed by the structure at alpha opening 905. Correspondingly, the capillary barrier formed by the structure at beta opening 906 prevented methanol flow into the reaction cell access hole 914. Flow into the reaction cell access holes 913 or 914, by either route, could be initiated by activating the appropriate pumps. For instance, to pump methanol through first prototype channel 911, first prototype electrode-based pump 901 and second prototype electrode-based pump 902 were biased by applying 200 V. Flow through the first prototype channel 911 was observed.

Example 4
Combinatorial Synthesis of Oligonucleotide

This synthesis begins with a number of polystyrene beads onto which is synthesized, by the phosphoramidite method, a protected oligonucleotide having a sequence (5' to 3'): GGAGCCATAGGACGAGAG. See, for instance, Caruthers et al., *Methods in Enzymology* 211: 3–20, 1992, for further discussion of oligonucleotide synthetic methods. The functionalized polystyrene beads, available from Bacham Bioscience (King of Prussia, Pa.) are inserted into each of the reaction cells of a microscale liquid distribution system having 4×4 reaction cells. The liquid distribution system has four first reservoirs, reservoir-1, reservoir-2, reservoir-3 and reservoir-4, each of which can address any reaction cell in the 4×4 array. The liquid distribution system has four second reservoirs, reservoir-5, reservoir-6, reservoir-7 and reservoir-8, each of which second reservoirs can address the four reaction cells along a given row (i.e., the reaction cells aligned along an EW axis). Further, the liquid distribution system has four third reservoirs, reservoir-9, reservoir-10, reservoir-11 and reservoir-12, each of which third reservoirs can address any of the four reaction cells in the corresponding column (i.e., reaction cells aligned along an NS axis).

The following process steps are executed:
1. Each of the reaction cells in the distribution system is washed with acetonitrile from reservoir-1.
2. 3% trichloro acetic acid (TCA) in dichloromethane, from reservoir-2, is pumped through all of the reaction cells. This solution is effective to remove the dimethoxytrityl protecting groups at the 5' ends of the oligonucleotides on the beads.
3. All of the reaction cells in the liquid distribution system are again flushed with acetonitrile from reservoir-1.
4. To the four reaction cells connected to reservoir-5, a mixture of 0.1M protected adenine phosphoramidite in acetonitrile is added. This addition is effective to attach protected adenosine groups to the 5' ends of the oligonucleotides in the four reaction cells connected to reservoir-5. To the four reaction cells connected to reservoir-6, a mixture of 0.1M protected cytosine phosphoramidite in acetonitrile is added. This addition is effective to attach protected cytosine groups to the 5' ends of the oligonucleotides in the four reaction cells connected to reservoir-6. To the four reaction cells connected to reservoir-7, a mixture of 0.1M protected guanosine phosphoramidite in acetonitrile is added. This addition is effective to attach protected guanosine groups to the 5' ends of the oligonucleotides in the four reaction cells connected to reservoir-7. To the four reaction cells connected to reservoir-8, a mixture of 0.1M protected thymidine phosphoramidite in acetonitrile is added. This addition is effective to attach protected thymidine groups to the 5' ends of the oligonucleotides in the four reaction cells connected to reservoir-7.
5. The reaction cells are washed with acetonitrile from reaction cells from reservoir-1.
6. The reaction cells are flushed with acetic anhydride:2, 6-lutidine:tetrahydrofuran 1:1:8 from reservoir-3. This solution is effective to cap any oligonucleotide chains that did not react with the added monomer.
7. The reaction cells are flushed with 1.1M tetrabutylperoxide in dichloromethane. This step is effective to oxidize the phosphite triester, which links the newly added monomer to the oligonucleotide, to a phosphate triester.
8. Steps 1–3 are repeated.
9. To the four reaction cells connected to reservoir-9, a mixture of 0.1M protected adenine phosphoramidite in acetonitrile is added. This addition is effective to attach protected adenosine groups to the 5' ends of the oligonucleotides in the four reaction cells connected to reservoir-9. To the four reaction cells connected to reservoir-10, a mixture of 0.1M protected cytosine phosphoramidite in acetonitrile is added. This addition is effective to attach protected cytosine groups to the 5' ends of the oligonucleotides in the four reaction cells connected to reservoir-10. To the four reaction cells connected to reservoir-11, a mixture of 0.1M protected guanosine phosphoramidite in acetonitrile is added. This addition is effective to attach protected guanosine groups to the 5' ends of the oligonucleotides in the four reaction cells connected to reservoir-1. To the four reaction cells connected to reservoir-12, a mixture of 0.1M protected thymidine phosphoramidite in acetonitrile is added. This addition is effective to attach protected thymidine groups to the 5' ends of the oligonucleotides in the four reaction cells connected to reservoir-12.

The above outlined process is effective to generate 16 separate oligonucleotides, each with a distinct dinucleotide sequence at the 5' end. Similar synthetic methods can be applied to create various combinatorial molecules, including peptides and other molecules such as those having potential pharmacological activity or those useful for diagnostic or other analytical application.

We claim:
1. A system for selectively distributing liquid from two or more liquid sources to a plurality of cells, the system comprising:
   (A) liquid sources;
   (B) a substrate comprising a network of fluid channels of capillary dimensions for directing liquid from the liquid sources to a plurality of outlets for outputting liquid at the cells;

(C) pumps, that move liquid with electrodes, for each outlet, wherein the electrodes are incorporated into the substrate, the pumps for selectively pumping liquid from a liquid source and out of one of the outlets;

(D) capillary barriers interposed in the channels, each comprising an opening into a chamber, each capillary barrier for inhibiting the flow of liquid out a given outlet; and (E) at least one gas reset mechanism comprising a network of channels having inlets into the chambers operable to inject gas in the chambers and thereby remove liquid from the chambers and improve the operation of the capillary barriers;

wherein the pumps can be selectively operated, and at least one said cell can receive liquid from either a first liquid source or another liquid source depending on the operation of the pumps.

2. The system for selectively distributing liquid of claim 1, further comprising:

(F) a receiving plate, on which the cells are located, that can be releasably positioned below the distribution plate.

3. The system for selectively distributing liquid of claim 1, further comprising:

(G) a gas pressurization system for applying pressure to liquid in the liquid sources.

4. The system for selectively distributing liquid of claim 1, further comprising:

(F) a receiving plate, on which the cells are located, that can be releasably positioned below the distribution plate; and (G) a gas pressurization system for applying pressure to liquid in the liquid sources.

5. A method of operating the system for selectively distributing liquid of claim 1 comprising:

(i) operating a first said pump to move the first liquid past a first capillary barrier and into a first cell;

(ii) operating the gas reset mechanism to reset the first capillary barrier; and (iii) operating a second said pump to move a second liquid past a second capillary barrier and into the first cell.

6. A method of operating the system for selectively distributing liquid of claim 1 comprising:

(1) operating a first said pump to move the first liquid past a first capillary barrier and into a first cell;

(2) concurrently with step (1), operating a second said pump to move a second liquid past a second capillary barrier and into a second cell;

(3) thereafter operating the gas reset mechanism to reset the first and second capillary barriers; and (4) thereafter operating (a) a third said pump to move a liquid that is distinct from the first liquid past a third capillary barrier and into the first cell or (b) a fourth said pump to move a liquid that is distinct from the second liquid past a fourth capillary barrier and into the second cell.

7. A liquid distribution system for delivering liquid to one or more locations, the liquid distribution system comprising:

(a) a liquid source;

(b) a substrate formed of two or more plates, the plates each having a first and second major surface and joined each one to another at such major surfaces, wherein one of the plates is a barrier plate;

(c) formed within the substrate, a channel addressable by the liquid source and having an outlet; and (d) formed within the substrate, a capillary barrier at the channel outlet, wherein at least a portion of the channel is formed along a junction of two of the plates, and wherein the capillary barrier is formed by an opening through the barrier plate, one end of which opening defines the channel outlet, and wherein the entire circumference of the outlet is surrounded by an uninterrupted portion of a major surface-of the barrier plate.

8. The liquid distribution system of claim 7, wherein in fluid connection with the barrier opening there is a vertical feeder channel that connects to a location so that liquid exiting the capillary barrier enters the vertical feeder channel and falls to the location.

9. The liquid distribution system of claim 7, further comprising, in the substrate, a pump that moves liquid with electrodes, which operates to move liquid past the capillary barrier.

10. The liquid distribution system of claim 7, further comprising:

(e) a cavity situated at the channel outlet, a surface of which is defined by the barrier plate; and (f) a liquid connection from the cavity to a location.

11. The liquid distribution system of claim 10, further comprising:

(g) a gas distribution network formed in the substrate and having a gas outlet adapted to direct gas into the cavity to remove liquid from the outlet of the channel.

12. The liquid distribution system of claim 7, further comprising:

(h) a pressure regulator for regulating the hydrostatic pressure of the liquid source such that the hydrostatic pressure can be changed from less than that required to breach the capillary barrier to at least that required to breach the capillary barrier and initiate liquid flow past the capillary barrier.

13. The liquid distribution system of claim 7, further comprising:

(i) a source of negative pressure that is attached either to the liquid source or the channel to aspirate the liquid out of the channel without drawing the liquid to the locations.

14. The liquid distribution system of claim 7, wherein the liquid distribution system selectively delivers liquid from two or more liquid sources to each of two or more locations.

15. A liquid distribution system for delivering liquid to two or more locations comprising:

(a) at least two liquid sources;

(b) a substrate comprising therein, for each said liquid source, at least one liquid carrying channel having an outlet and addressable by the liquid source and, two or more manifolds, interposed between the channels addressable by the two liquid sources and the locations, each manifold connected to the outlets of two or more said channels, which are connected to separate liquid sources, and each manifold in fluid connection with a single said location, wherein the outlets of the channels together with their respective manifolds form capillary barriers; and (c) for each liquid source, a pressure regulator for regulating the hydrostatic pressure of the liquid source so that the hydrostatic pressure is changed from less than that required to breach the capillary barrier to at least that required to breach the capillary barrier and initiate liquid flow past the capillary barrier and to the locations.

16. The liquid distribution system of claim 15, wherein the liquid sources comprise liquid-containing cartridges separate from the substrate, wherein the hydrostatic pressure is created by gas pressure applied to the cartridges.

17. The liquid distribution system of claim 15, further comprising:
   (d) an electronic controller for operating the pressure regulators.

18. A liquid distribution system for delivering liquid to one or more locations, the liquid distribution system comprising:
   (a) a liquid source;
   (b) a substrate comprising therein
      (i) one or more liquid carrying channels addressable by the liquid source,
      (ii) a chamber which is in fluid connection with a location, and
      (iii) an outlet of one of said channels opening into the chamber which, together with the chamber, forms a capillary barrier; and
   (c) a gas pressure distribution system, which is distinct from the liquid carrying channels having a gas outlet into the chamber, which outlet is distinct from the outlet of the liquid carrying channel and is adapted to direct gas into the chamber and out via the location, the gas effective to remove liquid from the outlet of the liquid carrying channel.

19. The liquid distribution system of claim 18, further comprising:
   (d) a pressure regulator for regulating the hydrostatic pressure of the liquid source such that the hydrostatic pressure can be changed from less than that required to breach the capillary barrier to at least that required to breach the capillary barrier and initiate liquid flow past the capillary barrier; and
   (e) an electronic controller for operating the pressure regulators.

20. The liquid distribution system of claim 18, further comprising:
   (d') a pressure regulator which operates from about 0 dynes per $cm^2$ to about $5 \times 10^3$ dynes per $cm^2$ for regulating the hydrostatic pressure of the liquid source such that the hydrostatic pressure in the liquid source can be changed from less than that required to breach the capillary barrier to at least that required to breach the capillary barrier and initiate liquid flow past the capillary barrier.

21. The liquid distribution system of claim 18, wherein the liquid distribution system selectively delivers liquid to each of two or more locations from two or more liquid sources using capillary barriers connected to the gas distribution system.

22. The liquid distribution system of claim 18, further comprising:
   (f) at least one a pump that moves liquid with electrodes, which operates to move liquid past the capillary barrier.

23. A method of operating a liquid distribution system comprising:
   (i) providing a liquid distribution system according to claims having a first said liquid source and a second said liquid source, each of which liquid sources can be directed to a given location via separate said channels;
   (ii) operating one or more of the pumps to move liquid from the first liquid source to the given location via a first said capillary barrier;
   (iii) after step (ii), applying gas to reset the first capillary barrier; and
   (iv) after step (iii), operating one or more of the pumps to move liquid from the second liquid source to the given location.

24. The method of claim 23, further comprising:
   (v) after step (iv), aspirating the liquid from one or more of the first and second liquid sources and the channels connecting said first or second liquid source to locations, but not thereby drawing liquid to the locations; and
   (vi) after step (v), replacing the liquid in the aspirated liquid source and channels with a liquid distinct from the aspirated liquid.

* * * * *